United States Patent
Brocke et al.

(10) Patent No.: US 10,662,377 B2
(45) Date of Patent: May 26, 2020

(54) LIQUID-CRYSTALLINE MEDIUM

(71) Applicant: MERCK PATENT GMBH, Darmstadt (DE)

(72) Inventors: Constanze Brocke, Gross-Gerau (DE); Atsutaka Manabe, Bensheim (DE); Michael Wittek, Erzhausen (DE); Renate Seeger, Riedstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 16/087,817

(22) PCT Filed: Mar. 22, 2017

(86) PCT No.: PCT/EP2017/056774
§ 371 (c)(1),
(2) Date: Sep. 24, 2018

(87) PCT Pub. No.: WO2017/162717
PCT Pub. Date: Sep. 28, 2017

(65) Prior Publication Data
US 2019/0106626 A1    Apr. 11, 2019

(30) Foreign Application Priority Data

Mar. 24, 2016 (EP) .................... 16162308

(51) Int. Cl.
| | | |
|---|---|---|
| *G02F 1/1333* | (2006.01) | |
| *C09K 19/32* | (2006.01) | |
| *C09K 19/18* | (2006.01) | |
| *C09K 19/20* | (2006.01) | |
| *C09K 19/30* | (2006.01) | |
| *C09K 19/12* | (2006.01) | |
| *C09K 19/04* | (2006.01) | |
| *H01Q 1/36* | (2006.01) | |

(52) U.S. Cl.
CPC ............ *C09K 19/322* (2013.01); *C09K 19/18* (2013.01); *C09K 19/20* (2013.01); *C09K 19/3003* (2013.01); *C09K 2019/0466* (2013.01); *C09K 2019/123* (2013.01); *C09K 2019/181* (2013.01); *C09K 2019/183* (2013.01); *C09K 2019/188* (2013.01); *C09K 2219/11* (2013.01); *H01Q 1/36* (2013.01)

(58) Field of Classification Search
CPC .. C09K 19/322; C09K 19/20; C09K 19/3003; C09K 2019/0466; H01Q 1/36; G02F 1/1333
USPC ................... 252/299.62
See application file for complete search history.

(56) References Cited

U.S. PATENT DOCUMENTS

| | | | | |
|---|---|---|---|---|
| 5,356,558 A | * | 10/1994 | Yamada | ............... C07C 25/24 |
| | | | | 252/299.01 |
| 2013/0221274 A1 | | 8/2013 | Reiffenrath | |
| 2014/0217325 A1 | * | 8/2014 | Manabe | ............... C07C 15/54 |
| | | | | 252/299.63 |

FOREIGN PATENT DOCUMENTS

| | | |
|---|---|---|
| EP | 581272 A1 | 2/1994 |
| EP | 776958 A1 | 6/1997 |
| WO | 2012048774 A1 | 4/2012 |

OTHER PUBLICATIONS

International Search Report PCT/EP2017/056774 dated May 29, 2017. (pp. 1-2).
Yong-Ming Zhang et al: "Novel high birefringence bistolane liquid crystals with lateral fluorosubstituent", Liquid Crystals, Taylor & Francis, vol. 39, No. 11, Nov. 1, 2012 (Nov. 1, 2012), pp. 1330-1339, XP001579008, ISSN: 0267-8292.

* cited by examiner

*Primary Examiner* — Geraldina Visconti
(74) *Attorney, Agent, or Firm* — Millen White Zelano and Branigan, PC; Csaba Henter

(57) ABSTRACT

The invention relates to a liquid crystalline medium, characterised in that it comprises one or more compounds of formula A

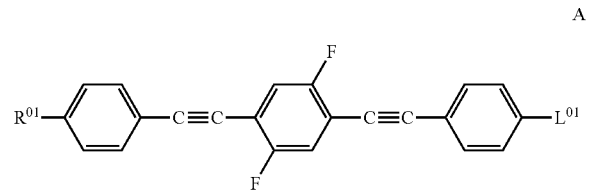

and
one or more compounds of formula II

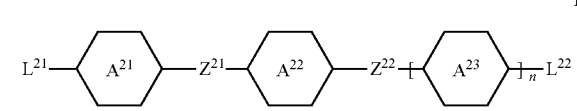

wherein the parameters have the meaning indicated in claim 1, and to high-frequency components comprising the same, especially microwave components for high-frequency devices, such as devices for shifting the phase of microwaves, in particular microwave phased-array antennas.

20 Claims, No Drawings

LIQUID-CRYSTALLINE MEDIUM

The present invention relates to liquid-crystalline media and to high-frequency components comprising the same, especially microwave components for high-frequency devices, such as devices for shifting the phase of microwaves, in particular microwave phased-array antennas.

Liquid-crystalline media have been used for decades in electro-optical displays (liquid crystal displays—LCDs) for the purpose of information display. A different application developed more recently is their use in components for microwave technology, such as, for example, disclosed in DE 10 2004 029 429 A and in JP 2005-120208 (A).

As a typical microwave application, the concept of the inverted microstrip line as described by K. C. Gupta, R. Garg, I. Bahl and P. Bhartia: Microstrip Lines and Slotlines, $2^{nd}$ ed., Artech House, Boston, 1996, is employed, for example, in D. Dolfi, M. Labeyrie, P. Joffre and J. P. Huignard: Liquid Crystal Microwave Phase Shifter. *Electronics Letters*, Vol. 29, No. 10, pp. 926-928, May 1993; N. Martin, N. Tentillier, P. Laurent, B. Splingart, F. Huert, P H. Gelin, C. Legrand: Electrically Microwave Tunable Components Using Liquid Crystals. $32^{nd}$ European Microwave Conference, pp. 393-396, Milan 2002; or in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002; C. Weil, G. Lüssem, and R. Jakoby: Tunable Invert-Microstrip Phase Shifter Device Using Nematic Liquid Crystals, *IEEE MTTS Int. Microw. Symp.*, Seattle, Wash., June 2002, pp. 367-370, together with the commercial liquid crystal K15 from Merck KGaA. C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, achieved phase shifter qualities of 12°/dB at 10 GHz with a control voltage of about 40 V therewith. The insertion losses of the LC, i.e. the losses caused only by the polarisation losses in the liquid crystal, are given as approximately 1 to 2 dB at 10 GHz in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002. In addition, it has been determined that the phase shifter losses are determined primarily by the dielectric LC losses and the losses at the waveguide junctions. T. Kuki, H. Fujikake, H. Kamoda and T. Nomoto: Microwave Variable Delay Line Using a Membrane Impregnated with Liquid Crystal. *IEEE MTT-S Int. Microwave Symp. Dig.* 2002, pp. 363-366, June 2002, and T. Kuki, H. Fujikake, T. Nomoto: Microwave Variable Delay Line Using Dual-Frequency Switching-Mode Liquid Crystal. *IEEE Trans. Microwave Theory Tech.*, Vol. 50, No. 11, pp. 2604-2609, November 2002, also address the use of polymerised LC films and dual-frequency switching-mode liquid crystals in combination with planar phase shifter arrangements.

A. Penirschke, S. Müller, P. Scheele, C. Weil, M. Wittek, C. Hock and R. Jakoby: "Cavity Perturbation Method for Characterization of Liquid Crystals up to 35 GHz", $34^{th}$ European Microwave Conference—Amsterdam, pp. 545-548 describe, inter alia, the properties of the known single liquid-crystalline substance K15 (Merck KGaA, Germany) at a frequency of 9 GHz.

A. Gaebler, F. Goelden, S. Müller, A. Penirschke and R. Jakoby "Direct Simulation of Material Permittivites using an Eigen-Susceptibility Formulation of the Vector Variational Approach", 12MTC 2009—International Instrumentation and Measurement Technology Conference, Singapore, 2009 (IEEE), pp. 463-467, describe the corresponding properties of the known liquid-crystal mixture E7 (likewise Merck KGaA, Germany).

DE 10 2004 029 429 A describes the use of liquid-crystal media in microwave technology, inter alia in phase shifters.

DE 10 2004 029 429 A has already investigated liquid-crystalline media with respect to their properties in the corresponding frequency range. In addition, it describes liquid-crystalline media which comprise compounds of the formulae

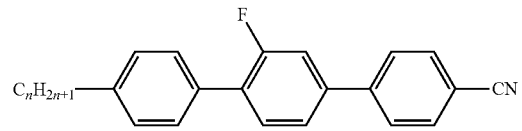

besides compounds of the formulae

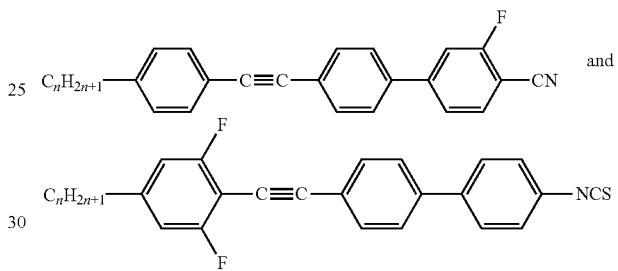

or besides compounds of the formulae

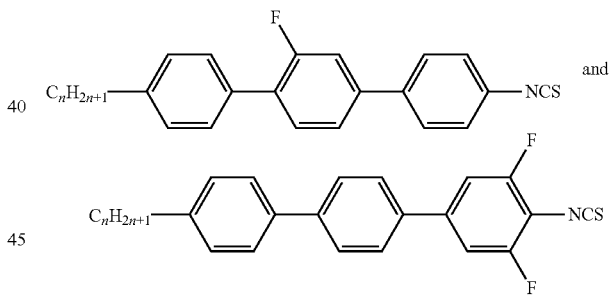

Further development in the field aims in particular at reduction of the loss in the microwave region and improvement of the material quality (η), as disclosed e.g in WO 2011/009524.

Liquid crystalline media comprising one or more of the compounds mentioned above, as well as similar ones, are proposed by for microwave applications e.g. in DE 10 2010 025 572 A1 and WO 2013/034227 A1, which discloses, amongst others, liquid crystalline media comprising compounds of the following formula

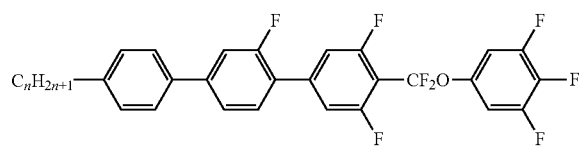

Furthermore, from the state-of-the art compounds with two triple bonds are known such as for example alkynyl tolanes (WO 2015/24635 A). A typical example is the following compound:

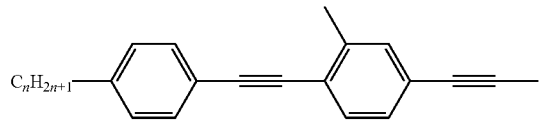

Structurally related are phenylalkynyl tolanes which are disclosed in for example WO 2012/048774 and WO 2012/097853, and where the central aromatic ring is substituted with two lateral substituents in ortho-position to each other, e.g.

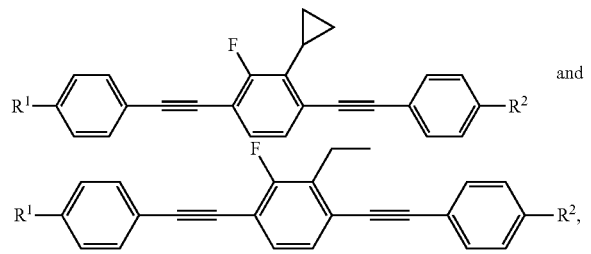

wherein $R^1$ and $R^2$ denote alkyl.

However, these compositions are afflicted with serious disadvantages. Most of them result, besides other deficiencies, in disadvantageously high losses and/or inadequate phase shifts or inadequate material quality.

For these applications, liquid-crystalline media with particular, hitherto rather unusual and uncommon properties, or combinations of properties, are required.

Surprisingly, it has been found that it is possible to achieve liquid-crystalline media having a suitably high Δε, a suitable nematic phase range and Δn which do not have the disadvantages of the prior-art materials, or at least only do so to a considerably reduced extent.

These improved liquid-crystalline media in accordance with the present invention comprise
a compound of formula A

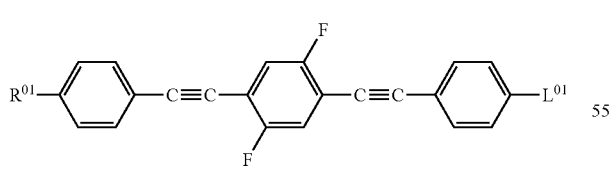

A wherein
$R^{01}$ is defined as $R^{11}$ below
$L^{01}$ is defined as $R^{11}$ or $X^{11}$ below,
and
additionally one or more compounds of formula II below, and
optionally one or more compounds of formula I.

I wherein
$L^{11}$ denotes $R^{11}$ or $X^{11}$,
$L^{12}$ denotes $R^{12}$ or $X^{12}$,
$R^{11}$ and $R^{12}$, independently of one another, denote H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably unfluorinated alkyl or unfluorinated alkenyl,
$X^{11}$ and $X^{12}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and

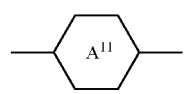

to

independently of one another, denote

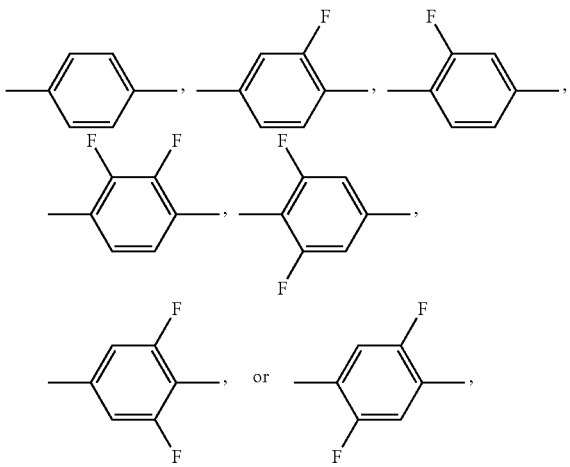

preferably

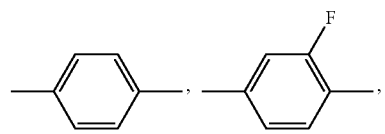

-continued

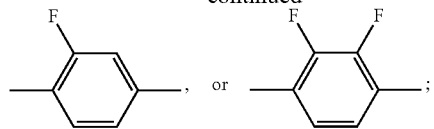

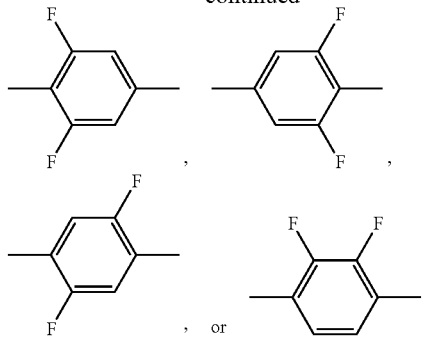

wherein
- $L^{21}$ denotes $R^{21}$ and, in the case where $Z^{21}$ and/or $Z^{22}$ denote trans-CH=CH— or trans-CF=CH—, alternatively denotes $X^{21}$,
- $L^{22}$ denotes $R^{22}$ and, in the case where $Z^{21}$ and/or $Z^{22}$ denote trans-CH=CH— or trans-CF=CF—, alternatively denotes $X^{22}$,
- $R^{21}$ and $R^{22}$, independently of one another, denote H, unfluorinated alkyl or unfluorinated alkoxy having 1 to 17, preferably having 3 to 10, C atoms or unfluorinated alkenyl, unfluorinated alkynyl, unfluorinated alkenyloxy or unfluorinated alkoxyalkyl having 2 to 15, preferably 3 to 10 C atoms, preferably unfluorinated alkyl, alkenyl or alkynyl,
- $X^{21}$ and $X^{22}$, independently of one another, denote F or Cl, —CN, —NCS, —SF$_5$, fluorinated alkyl or alkoxy having 1 to 7 C atoms or fluorinated alkenyl, alkenyloxy or alkoxyalkyl having 2 to 7 C atoms, or —NCS, preferably —NCS,
- $Z^{21}$ and $Z^{22}$ denotes trans-CH=CH—, trans-CF=CF—, —C≡C— or a single bond, with the proviso that at least one of $Z^{21}$ and $Z^{22}$ denotes —C≡C—,

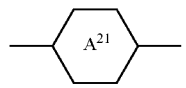

to

independently of one another, denote

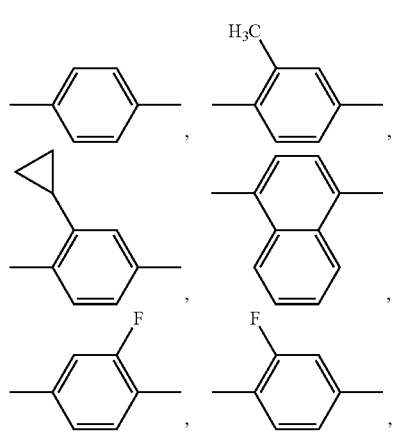

and n denotes 0 or 1,

In a preferred embodiment of the present invention, the liquid-crystal medium comprises one or more compounds of the formula A selected from the group of the compounds of the sub-formulae A-1 and A-2

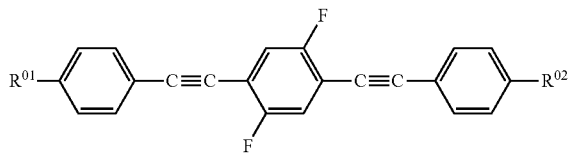

A-1

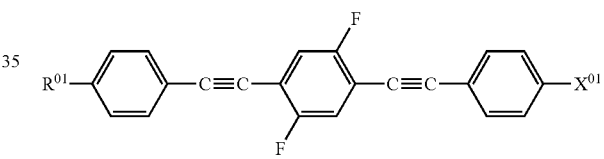

A-2 wherein $R^{01}$ and $R^{02}$ denote alkyl with 1 to 7 C atoms and $X^{01}$ denotes F, Cl, —NCS, —SF$_5$, fluorinated alkyl, fluorinated alkenyl or fluorinated alkoxy having 1 to 7 C atoms.

In a preferred embodiment of the present invention, the liquid-crystal medium comprises one or more compounds of the formula I, preferably selected from the group of the compounds of the formulae I-1 to I-3

I-1

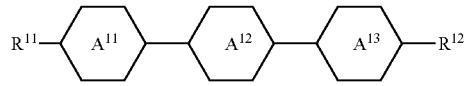

I-2

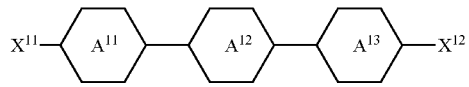

I-3 wherein the parameters have the respective meanings indicated above for formula I and preferably
- $R^{11}$ denotes unfluorinated alkyl having 1 to 7 C atoms or unfluorinated alkenyl having 2 to 7 C atoms, $R^{12}$ denotes unfluorinated alkyl having 1 to 7 C atoms or unfluorinated alkenyl having 2 to 7 C atoms or unfluorinated alkoxy having 1 to 7 C atoms, $X^{11}$ and $X^{12}$, independently of one another, denote F, Cl, $OCF_3$, $CF_3$, —CN, —NCS or $SF_5$, preferably F, Cl, $OCF_3$ or —CN.

The compounds of the formula I-1 are preferably selected from the group of the compounds of the formulae I-1a to I-1d

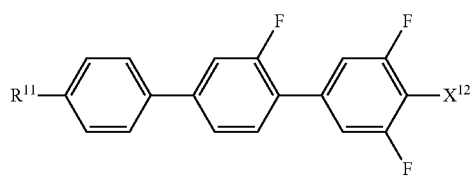

I-1a

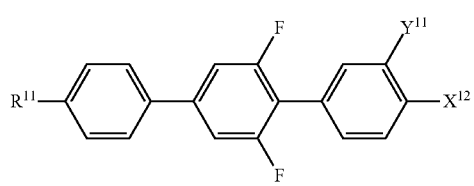

I-1b

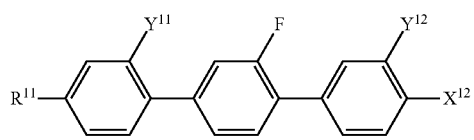

I-1c

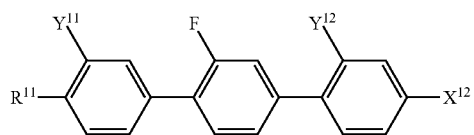

I-1d wherein the parameters have the respective meanings indicated above for formula I-1 and wherein $Y^{11}$ and $Y^{12}$ independently of one another, denote H or F, and preferably $R^{11}$ denotes alkyl or alkenyl, and $X^{12}$ denotes F, Cl or $OCF_3$.

The compounds of the formula I-2 are preferably selected from the group of the compounds of the formulae I-2a to I-2e and/or from the group of the compounds of the formulae I-2f and I-2g

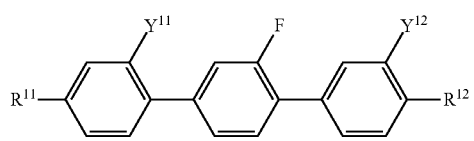

I-2a

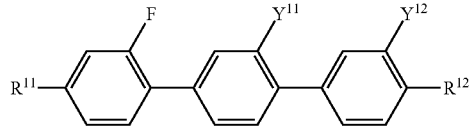

I-2b

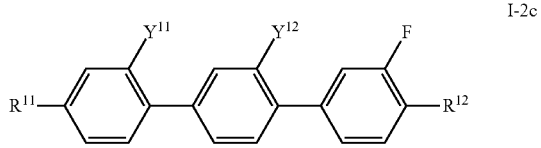

I-2c

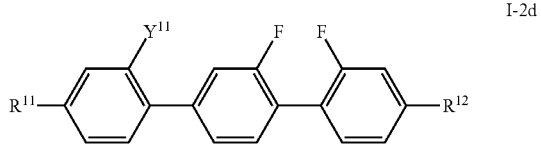

I-2d

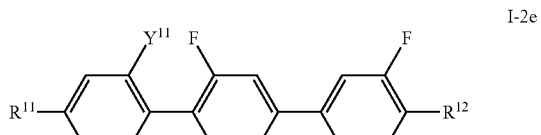

I-2e

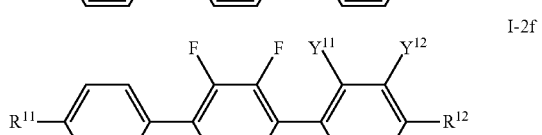

I-2f

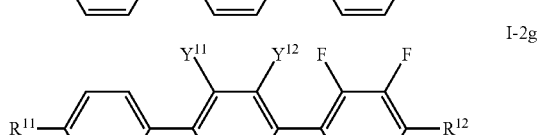

I-2g where in each case the compounds of the formula I-2a are excluded from the compounds of the formulae I-2b and I-2c, the compounds of the formula I-2b are excluded from the compounds of the formulae I-2c and the compounds of the formula I-2g are excluded from the compounds of the formulae I-2f, and wherein the parameters have the respective meanings indicated above for formula I-1 and wherein $Y^{11}$ and $Y^{12}$ each, independently of one another, denote H or F, and preferably $R^{12}$ denotes alkyl or alkenyl, $Y^{11}$ and $Y^{12}$ denotes H and the other denotes H or F, preferably likewise denotes H.

The compounds of the formula I-3 are preferably compounds of the formula I-3a:

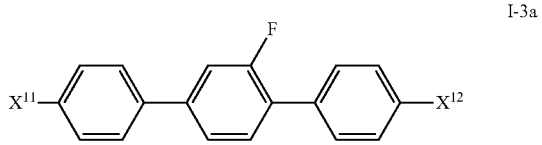

I-3a wherein the parameters have the respective meanings indicated above for formula I-1 and wherein preferably $X^{11}$ denotes F, Cl, preferably F, $X^{12}$ denotes F, Cl or —$OCF_3$, preferably —$OCF_3$.

In an even more preferred embodiment of the present invention, the compounds of the formula I are selected from the group of the compounds I-1a to I-1d, preferably selected from the group of the compounds I-1c and I-1d.

The compounds of the formula I-1a are preferably selected from the group of the compounds I-1a-1 and I-1a-2

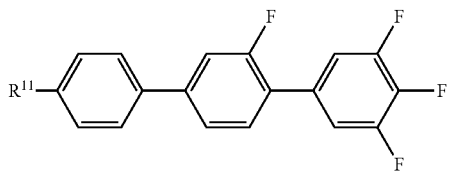

I-1a-1

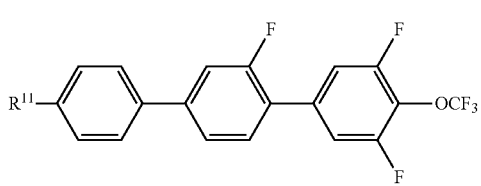

I-1a-2 wherein

R$^{11}$ has the meaning indicated above and preferably denotes C$_n$H$_{2n+1}$, wherein n denotes an integer in the range from 0 to 7, preferably in the range from 1 to 5 and particularly preferably 3 or 7.

The compounds of the formula I-1b are preferably compounds of the formula I-1b-1:

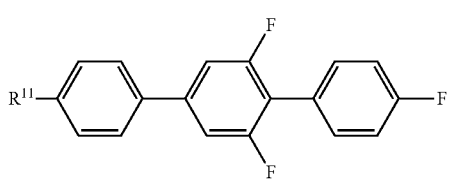

I-1b-1 wherein

R$^{11}$ has the meaning indicated above and preferably denotes C$_n$H$_{2n+1}$, wherein n denotes an integer in the range from 0 to 15, preferably in the range from 1 to 7 and particularly preferably 1 to 5.

The compounds of the formula I-1c are preferably selected from the group of the compounds of the formulae I-1c-1 and I-1c-4, preferably selected from the group of the compounds of the formulae I-1c-1 and I-1c-2,

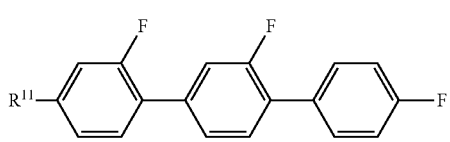

I-1c-1

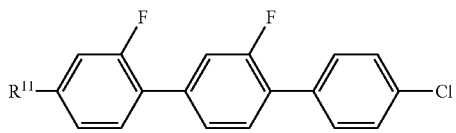

I-1c-2

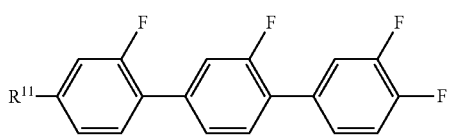

I-1c-3

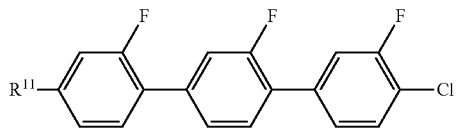

I-1c-4 wherein

R$^{11}$ has the meaning indicated above and preferably denotes C$_n$H$_{2n+1}$, wherein n denotes an integer in the range from 0 to 15, preferably in the range from 1 to 7 and particularly preferably 1 to 5.

The compounds of the formula I-1d are preferably selected from the group of the compounds of the formulae I-1d-1 and I-1d-2, preferably from the compound of the formula I-1d-2,

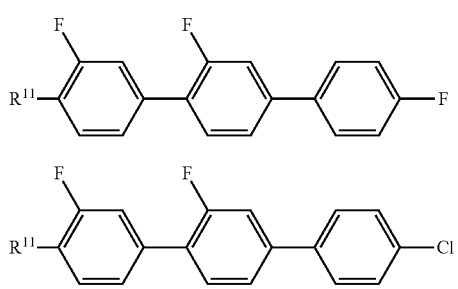

I-1d-1

I-1d-2 wherein

R$^{11}$ has the meaning indicated above and preferably denotes C$_n$H$_{2n+1}$, wherein n denotes an integer in the range from 0 to 15, preferably in the range from 1 to 7 and particularly preferably 1 to 5.

The compounds of the formula I-2a are preferably selected from the group of the compounds of the formulae I-2a-1 and I-2a-2, preferably from the compounds of the formula I-2a-1,

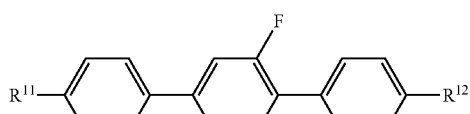

I-2a-1

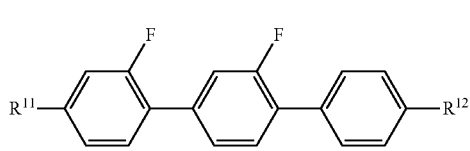

I-2a-2 wherein

R$^{11}$ has the meaning indicated above and preferably denotes C$_n$H$_{2n+1}$ or CH$_2$=CH—(CH$_2$)$_Z$, and R$^{12}$ has the meaning indicated above and preferably denotes C$_m$H$_{2m+1}$ or O—C$_m$H$_{2m+1}$ or (CH$_2$)$_Z$—CH=CH$_2$, and wherein n and m, independently of one another, denote an integer in the range from 0 to 15, preferably in the range from 1 to 7 and particularly preferably 1 to 5, and z denotes 0, 1, 2, 3 or 4, preferably 0 or 2.

Preferred combinations of (R$^{11}$ and R$^{12}$), in particular in formula I-2a-1, are (C$_n$H$_{2n+1}$ and C$_m$H$_{2m+1}$), (C$_n$H$_{2n+1}$ and O—$C_mH_{2m+1}$), ($CH_2$=CH—($CH_2$)$_z$ and $C_mH_{2m+1}$), ($CH_2$=CH—($CH_2$)$_z$ and O—$C_mH_{2m+1}$) and ($C_nH_{2n+1}$ and ($CH_2$)$_z$—CH=$CH_2$).

Preferred compounds of the formula I-2b are the compounds of the formula I-2b-1:

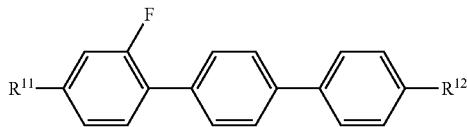

I-2b-1 wherein
$R^{11}$ has the meaning indicated above and preferably denotes $C_nH_{2n+1}$ or $CH_2$=CH—($CH_2$)$_z$, and
$R^{12}$ has the meaning indicated above and preferably denotes $C_mH_{2m+1}$ or O—$C_mH_{2m+1}$ or ($CH_2$)$_z$—CH=$CH_2$, and wherein
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of ($R^{11}$ and $R^{12}$) here is, in particular, ($C_nH_{2n+1}$ and $C_mH_{2m+1}$).

Preferred compounds of the formula I-2c are the compounds of the formula I-2c-1:

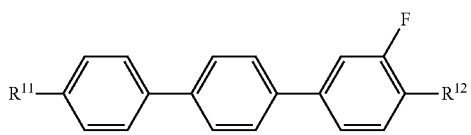

I-2c-1 wherein
$R^{11}$ has the meaning indicated above and preferably denotes $C_nH_{2n+1}$ or $CH_2$=CH—($CH_2$)$_z$, and
$R^{12}$ has the meaning indicated above and preferably denotes $C_mH_{2m+1}$ or O—$C_mH_{2m+1}$ or ($CH_2$)$_z$—CH=$CH_2$, and wherein
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of ($R^{11}$ and $R^{12}$) here is, in particular, ($C_nH_{2n+1}$ and $C_mH_{2m+1}$).

Preferred compounds of the formula I-2d are the compounds of the formula I-2d-1:

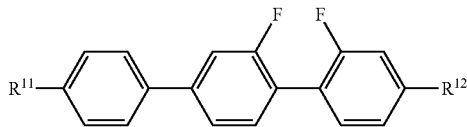

I-2d-1 wherein
$R^{11}$ has the meaning indicated above and preferably denotes $C_nH_{2n+1}$ or $CH_2$=CH—($CH_2$)$_z$, and
$R^{12}$ has the meaning indicated above and preferably denotes $C_mH_{2m+1}$ or O—$C_mH_{2m+1}$ or ($CH_2$)$_z$—CH=$CH_2$, and wherein n and m, independently of one another, denote an integer in the range from 0 to 15, preferably in the range from 1 to 7 and particularly preferably 1 to 5, and
z 0, 1, 2, 3 or 4, preferably 0 or 2.

The preferred combination of ($R^{11}$ and $R^{12}$) here is, in particular, ($C_nH_{2n+1}$ and $C_mH_{2m+1}$).

Preferred compounds of the formula I-2e are the compounds of the formula I-2e-1:

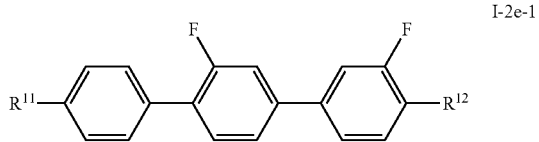

I-2e-1 wherein
$R^{11}$ has the meaning indicated above and preferably denotes $C_nH_{2n+1}$ or $CH_2$=CH—($CH_2$)$_z$, and
$R^{12}$ has the meaning indicated above and preferably denotes $C_mH_{2m+1}$ or O—$C_mH_{2m+1}$ or ($CH_2$)$_z$—CH=$CH_2$, and wherein
n and m, independently of one another, denote an integer in the range from 0 to 15, preferably in the range from 1 to 7 and particularly preferably 1 to 5, and
z 0, 1, 2, 3 or 4, preferably 0 or 2.

The preferred combination of ($R^{11}$ and $R^{12}$) here is, in particular, ($C_nH_{2n+1}$ and O—$C_mH_{2m+1}$).

Preferred compounds of the formula I-2f are the compounds of the formula I-2f-1:

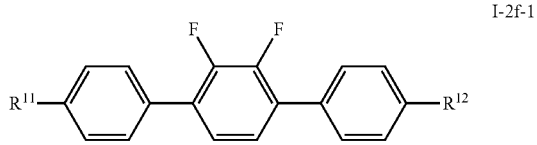

I-2f-1 wherein
$R^{11}$ has the meaning indicated above and preferably denotes $C_nH_{2n+1}$ or $CH_2$=CH—($CH_2$)$_z$, and
$R^{12}$ has the meaning indicated above and preferably denotes $C_mH_{2m+1}$ or O—$C_mH_{2m+1}$ or ($CH_2$)$_z$—CH=$CH_2$, and wherein
n and m, independently of one another, denote an integer in the range from 0 to 15, preferably in the range from 1 to 7 and particularly preferably 1 to 5, and
z 0, 1, 2, 3 or 4, preferably 0 or 2.

The preferred combinations of ($R^{11}$ and $R^{12}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

Preferred compounds of the formula I-2g are the compounds of the formula I-2g-1:

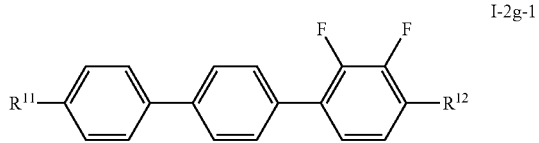

I-2g-1 wherein
R$^{11}$ has the meaning indicated above and preferably denotes C$_n$H$_{2n+1}$ or CH$_2$=CH—(CH$_2$)$_Z$, and
R$^{12}$ has the meaning indicated above and preferably denotes C$_m$H$_{2m+1}$ or O—C$_m$H$_{2m+1}$ or (CH$_2$)$_Z$—CH=CH$_2$, and wherein
n and m, independently of one another, denote an integer in the range from 0 to 15, preferably in the range from 1 to 7 and particularly preferably 1 to 5, and
z 0, 1, 2, 3 or 4, preferably 0 or 2.

The preferred combinations of (R$^{11}$ and R$^{12}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and O—C$_m$H$_{2m+1}$).

The compounds of the formula II are preferably selected from the group of the compounds of the formulae II-1 to II-6,

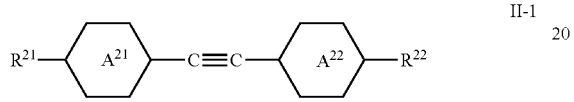

II-1

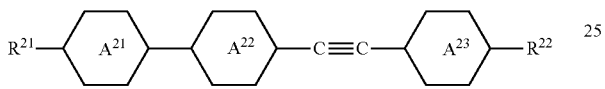

II-2

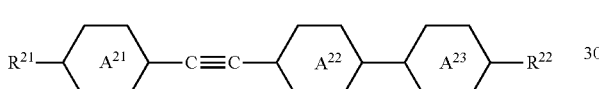

II-3

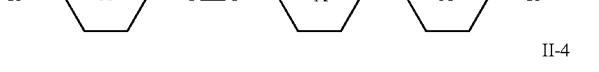

II-4

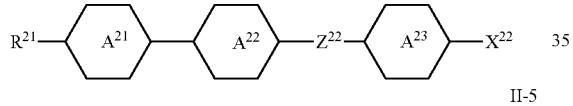

II-5

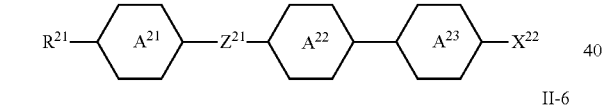

II-6 wherein
Z$^{21}$ and Z$^{22}$ denote trans-CH=CH— or trans-CF=CF—, preferably trans-CH=CH—, and the other parameters have the meaning given above under formula II, and preferably
R$^{21}$ and R$^{22}$, independently of one another, denote H, unfluorinated alkyl or unfluorinated alkoxy having 1 to 17, preferably having 3 to 10, C atoms or unfluorinated alkenyl, unfluorinated alkynyl, unfluorinated alkenyloxy or unfluorinated alkoxyalkyl having 2 to 15, preferably 3 to 10 C atoms, preferably unfluorinated alkyl, alkenyl or alkynyl,
X$^{22}$ denotes F, Cl, —CN or —NCS, preferably —NCS, and one of

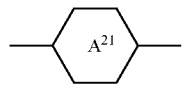

to

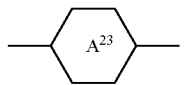

denotes

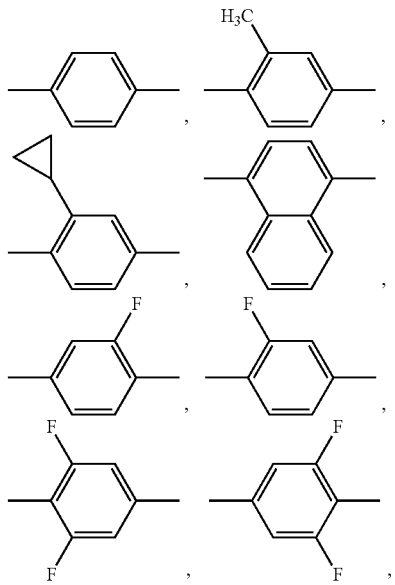

and the others independently of each other denote

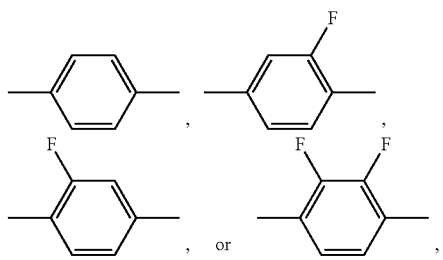

and preferably
R$^{21}$ denotes C$_n$H$_{2n+1}$ or CH$_2$=CH—(CH$_2$)$_Z$, and
R$^{22}$ denotes C$_m$H$_{2m+1}$ or O—C$_m$H$_{2m+1}$, (CH$_2$)$_Z$—CH=CH$_2$ or —C≡C—(CH$_2$)$_{Z-1}$CH$_3$ and wherein
n and m, independently of one another, denote an integer in the range from 0 to 15, preferably in the range from 1 to 7 and particularly preferably 1 to 5, and
z denotes 0, 1, 2, 3 or 4, preferably 0 or 2,
and where the compounds of the formula II-3 are excluded from the compounds of the formula II-2.

The compounds of the formula II-1 are preferably selected from the group of the compounds of the formulae II-1a and II-1b:

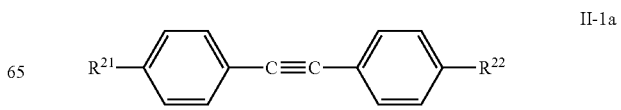

II-1a

-continued

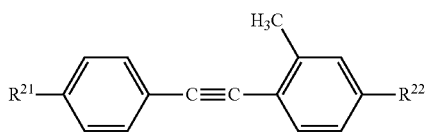
II-1b wherein
$R^{21}$ has the meaning indicated above and preferably denotes $C_nH_{2n+1}$ or $CH_2=CH-(CH_2)_Z$, and
$R^{22}$ has the meaning indicated above and preferably denotes $C_mH_{2m+1}$ or $O-C_mH_{2m+1}$, $(CH_2)_Z-CH=CH_2$ or $-C\equiv C-(CH_2)_y CH_3$ and wherein
n and m, independently of one another, denote an integer in the range from 0 to 15, preferably in the range from 1 to 7 and particularly preferably 1 to 5, and
y denotes 0, 1, 2, 3 or 4, preferably 0,
z denotes 0, 1, 2, 3 or 4, preferably 0 or 2.

In a particularly preferred embodiment the compounds of formula II-1a and II-1b are selected from the group of compounds of the formulae II-1a-1 and II-1a-2

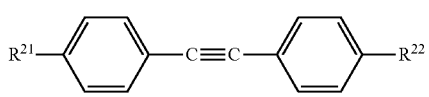
II-1a-1

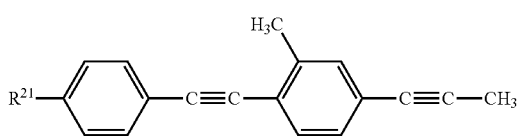
II-1b-1 wherein $R^{21}$ and $R^{22}$ denote alkyl with 1 to 6 C atoms.

The compounds of the formula II-2 are preferably selected from the group of the compounds of the formulae II-2a and II-2b, preferably selected from the group of the compounds of the formula II-2a,

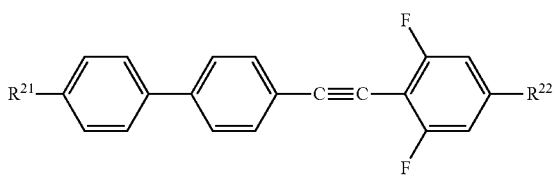
II-2a

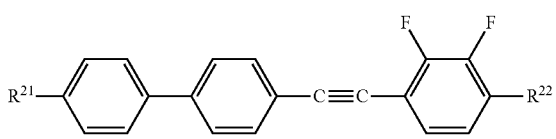
II-2b wherein
$R^{21}$ has the meaning indicated above and preferably denotes $C_nH_{2n+1}$ or $CH_2=CH-(CH_2)_Z$, and
$R^{22}$ has the meaning indicated above and preferably denotes $C_mH_{2m+1}$ or $O-C_mH_{2m+1}$ or $(CH_2)_Z-CH=CH_2$, and wherein
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{21}$ and $R^{22}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$) in the case of formula II-1a and particularly preferably ($C_nH_{2n+1}$ and $O-C_mH_{2m+1}$) in the case of formula II-1b.

The compounds of the formula II-3 are preferably compounds of the formula II-3a:

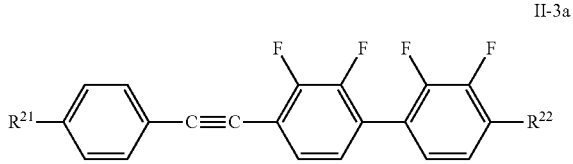
II-3a wherein
$R^{21}$ has the meaning indicated above and preferably denotes $C_nH_{2n+1}$ or $CH_2=CH-(CH_2)_Z$, and
$R^{22}$ has the meaning indicated above and preferably denotes $C_mH_{2m+1}$ or $O-C_mH_{2m+1}$ or $(CH_2)_Z-CH=CH_2$, and wherein
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{21}$ and $R^{22}$) here are, in particular, ($C_nH_{2n+1}$ and $C_mH_{2m+1}$) and ($C_nH_{2n+1}$ and $O-C_mH_{2m+1}$).

The compounds of the formula II-4 are preferably compounds of the formula II-4a:

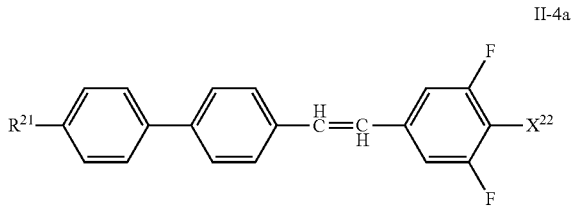
II-4a wherein the parameters have the meanings indicated above for formula II-4 and preferably
$R^{21}$ has the meaning indicated above and preferably denotes $C_nH_{2n+1}$, wherein
n denotes an integer in the range from 0 to 7, preferably in the range from 1 to 5, and
$X^{22}$ denotes $-F$, $-Cl$, $-OCF_3$, $-CN$ or $-NCS$, particularly preferably $-NCS$.

The compounds of the formula II-5 are preferably compounds of the formula II-5a:

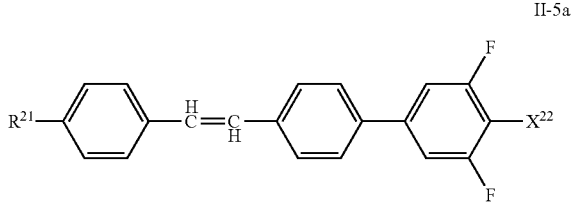
II-5a wherein the parameters have the meanings indicated above for formula II-4 and preferably $R^{21}$ has the meaning indicated above and preferably denotes $C_nH_{2n+1}$, wherein n denotes an integer in the range from 0 to 7, preferably in the range from 1 to 5, and $X^{22}$ denotes —F, —Cl, —OCF$_3$, —CN or —NCS, particularly preferably —NCS.

Further preferred compounds of the formula II are the compounds of the following formulae:

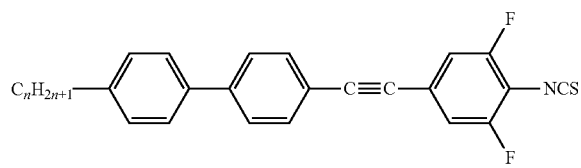

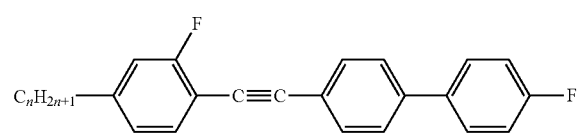

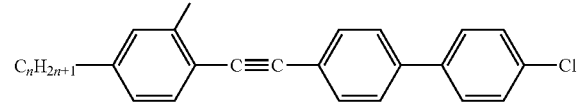

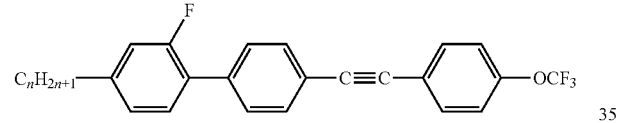

wherein n denotes an integer in the range from 0 to 7, preferably in the range from 1 to 5.

The compounds of the formula II-6 are preferably selected from the group of compounds of the formulae II-6a to II-6a

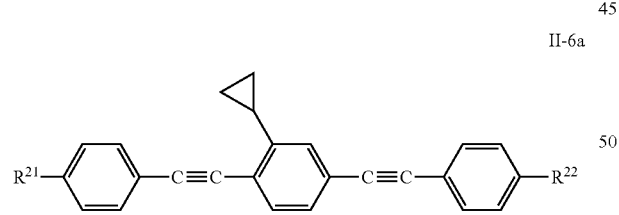

II-6b

II-6c

-continued

II-6d

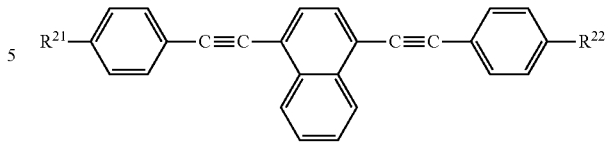

wherein $R^{21}$ and $R^{22}$ denote alkyl having 1 to 6 carbon atoms.

The media according to the present invention optionally comprise one or more compounds of formula III

III

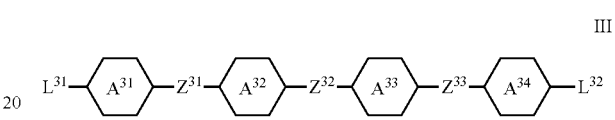

wherein $L^{31}$ denotes $R^{31}$ or $X^{31}$, $L^{32}$ denotes $R^{32}$ or $X^{32}$, $R^{31}$ and $R^{32}$, independently of one another, denote H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably unfluorinated alkyl or unfluorinated alkenyl, $X^{31}$ and $X^{32}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and $Z^{31}$ to $Z^{33}$, independently of one another, denote trans-CH=CH—, trans-CF=CF—, —C≡C— or a single bond, preferably one or more of them denotes a single bond, particularly preferably all denote a single bond, and

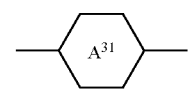

to

independently of one another, denote

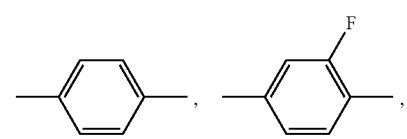

-continued

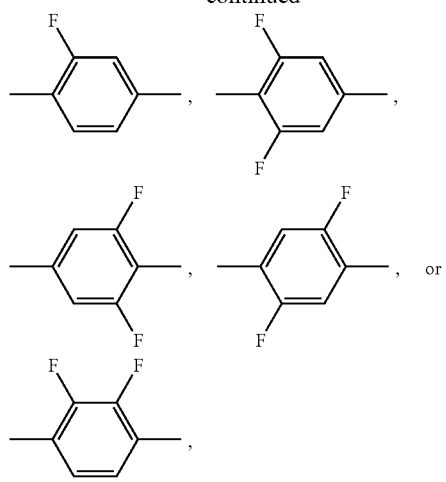

preferably

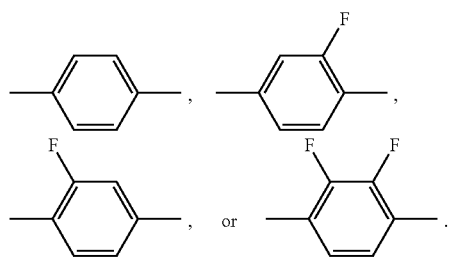

The compounds of the formula III are preferably selected from the group of the compounds of the formulae III-1 to III-7,

III-1

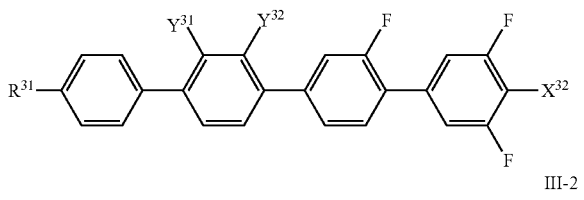

III-2

III-3

III-4

III-5

III-6

III-7 wherein the compounds of the formula III-5 are excluded from the compounds of the formula III-6, and wherein the parameters have the respective meanings indicated above for formula III and preferably $R^{31}$ denotes unfluorinated alkyl or alkoxy, each having 1 to 7 C atoms, or unfluorinated alkenyl having 2 to 7 C atoms, $R^{32}$ denotes unfluorinated alkyl or alkoxy, each having 1 to 7 C atoms, or unfluorinated alkenyl having 2 to 7 C atoms, and $X^{32}$ denotes F, Cl, or —$OCF_3$, preferably F, and $Y^{31}$, $Y^{32}$ denote, the same of different, H or F.

Particularly preferably $R^{31}$ has the meaning indicated above and preferably denotes $C_nH_{2n+1}$ or $CH_2$=$CH$—$(CH_2)_z$, and $R^{32}$ has the meaning indicated above and preferably denotes $C_mH_{2m+1}$ or O—$C_mH_{2m+1}$ or $(CH_2)_z$—$CH$=$CH_2$, and wherein n and m, independently of one another, denote an integer in the range from 0 to 15, preferably in the range from 1 to 7 and particularly preferably 1 to 5, and z denotes 0, 1, 2, 3 or 4, preferably 0 or 2.

The compounds of the formula III-1 are preferably selected from the group of the compounds of the formulae III-1a to III-1d, III-1a III-1b -continued

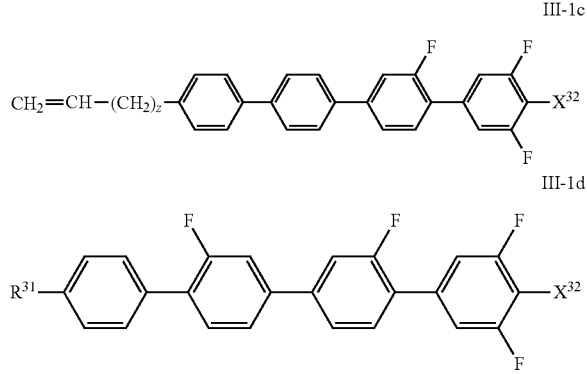

wherein $X^{32}$ has the meaning given above for formula III and $R^{31}$ has the meaning indicated above and preferably denotes $C_nH_{2n+1}$, wherein n denotes 1 to 7, preferably 2 to 6, particularly preferably 2, 3 or 5, z denotes 0, 1, 2, 3 or 4, preferably 0 or 2, and $X^{32}$ preferably denotes F.

The compounds of the formula III-2 are preferably selected from the group of the compounds of the formulae III-2a and III-2b, preferably of the formula III-2a,

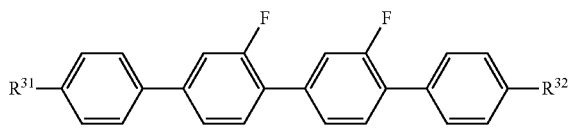

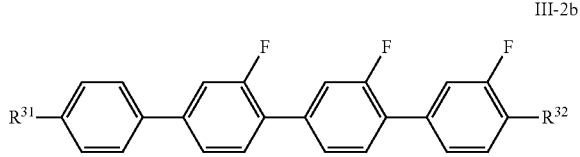

wherein $R^{31}$ has the meaning indicated above and preferably denotes $C_nH_{2n+1}$ or $CH_2=CH-(CH_2)_Z$, and $R^{32}$ has the meaning indicated above and preferably denotes $C_mH_{2m+1}$ or $O-C_mH_{2m+1}$ or $(CH_2)_Z-CH=CH_2$, and wherein n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula III-3 are preferably compounds of the formula III-3a:

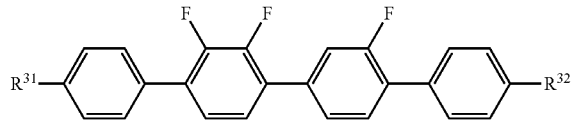

wherein $R^{31}$ has the meaning indicated above and preferably denotes $C_nH_{2n+1}$ or $CH_2=CH-(CH_2)_Z$, and $R^{32}$ has the meaning indicated above and preferably denotes $C_mH_{2m+1}$ or $O-C_mH_{2m+1}$ or $(CH_2)_Z-CH=CH_2$, and wherein n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula III-4 are preferably compounds of the formula III-4a:

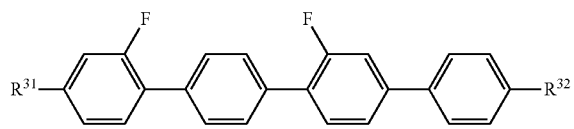

wherein $R^{31}$ has the meaning indicated above and preferably denotes $C_nH_{2n+1}$ or $CH_2=CH-(CH_2)_Z$, and $R^{32}$ has the meaning indicated above and preferably denotes $C_mH_{2m+1}$ or $O-C_mH_{2m+1}$ or $(CH_2)_Z-CH=CH_2$, and wherein n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula III-5 are preferably selected from the group of the compounds of the formulae III-5a and III-5b, preferably of the formula III-5a,

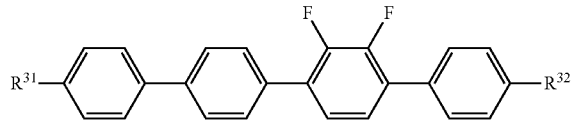

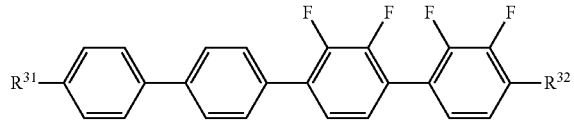

wherein

R$^{31}$ has the meaning indicated above and preferably denotes C$_n$H$_{2n+1}$ or CH$_2$=CH—(CH$_2$)$_Z$, and R$^{32}$ has the meaning indicated above and preferably denotes C$_m$H$_{2m+1}$ or O—C$_m$H$_{2m+1}$ or (CH$_2$)$_Z$—CH=CH$_2$, and wherein n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula III-6 are preferably selected from the group of the compounds of the formulae III-6a and III-6b,

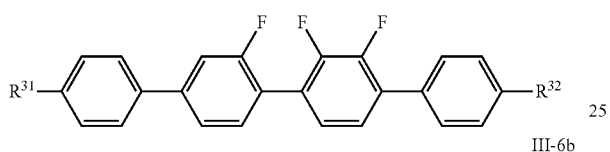

III-6a

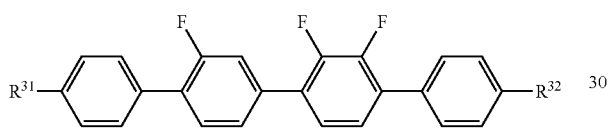

III-6b wherein

R$^{31}$ has the meaning indicated above and preferably denotes C$_n$H$_{2n+1}$ or CH$_2$=CH—(CH$_2$)$_Z$, and R$^{32}$ has the meaning indicated above and preferably denotes C$_m$H$_{2m+1}$ or O—C$_m$H$_{2m+1}$ or (CH$_2$)$_Z$—CH=CH$_2$, and wherein n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The media in accordance with the present invention optionally comprise one or more compounds of the formula IV

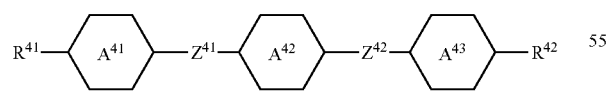

IV wherein

R$^{41}$ and R$^{42}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl, one of Z$^{41}$ and Z$^{42}$ denotes trans-CH=CH—, trans-CF=CF— or —C≡C— and the other denotes, independently thereof, trans-CH=CH—, trans-CF=CF— or a single bond, preferably one of them denotes —C≡C— or trans-CH=CH— and the other denotes a single bond, and

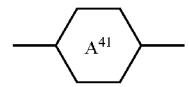

denotes

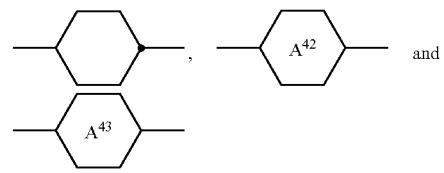

independently of one another, denote

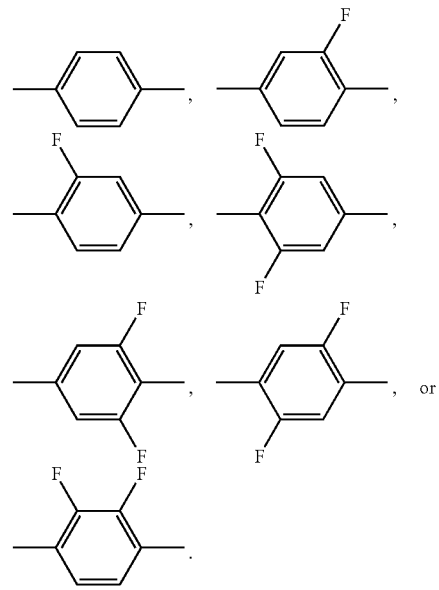

The compounds of the formulae IV are preferably selected from the group of the compounds of the formulae IV-1 to IV-3,

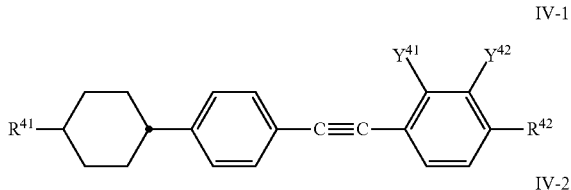

IV-1

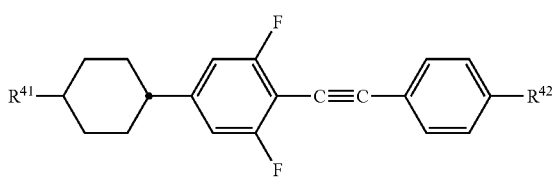

IV-2

-continued

IV-3

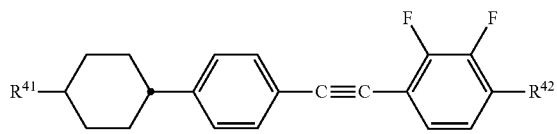

wherein
one of
$Y^{41}$ and $Y^{42}$ denotes H and the other denotes H or F, and
$R^{41}$ has the meaning indicated above and preferably denotes $C_nH_{2n+1}$ or $CH_2$=CH—$(CH_2)_z$, and
$R^{42}$ has the meaning indicated above and preferably denotes $C_mH_{2m+1}$ or O—$C_mH_{2m+1}$ or $(CH_2)_z$—CH=$CH_2$, and wherein
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{41}$ and $R^{42}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

The compounds of the formulae IV-1 are preferably selected from the group of the compounds of the formulae IV-1a to IV-1c, IV-1a

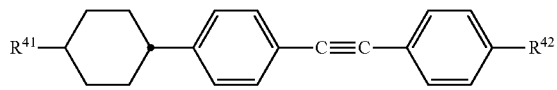

IV-1b

IV-1c

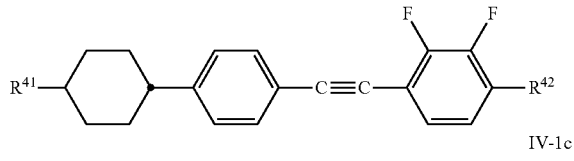

wherein
$R^{41}$ has the meaning indicated above and preferably denotes $C_nH_{2n+1}$ or $CH_2$=CH—$(CH_2)_z$, and
$R^{42}$ has the meaning indicated above and preferably denotes $C_mH_{2m+1}$ or O—$C_mH_{2m+1}$ or $(CH_2)_z$—CH=$CH_2$, and wherein
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{41}$ and $R^{42}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

The media in accordance with the present invention optionally comprise one or more compounds of the formula V

V

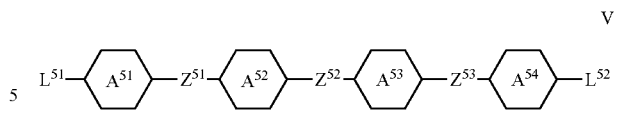

wherein
$L^{51}$ denotes $R^{51}$ or $X^{51}$,
$L^{52}$ denotes $R^{52}$ or $X^{52}$,
$R^{51}$ and $R^{52}$, independently of one another, denote H, unfluorinated alkyl or alkoxy having 1 to 15, preferably 3 to 10 C atoms or unfluorinated alkenyl, alkenyloxy or alkoxyalkyl having 2 to 15, preferably 3 to 10, C atoms, preferably unfluorinated alkyl or alkenyl,
$X^{51}$ and $X^{52}$, independently of one another, denote H, F, Cl, —CN, —NCS, —$SF_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and
$Z^{51}$ to $Z^{53}$, independently of one another, denote trans-CH=CH—, trans-CF=CF—, —C≡C— or a single bond, preferably one or more of them denotes a single bond, and particularly preferably all denote a single bond,

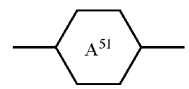

denotes

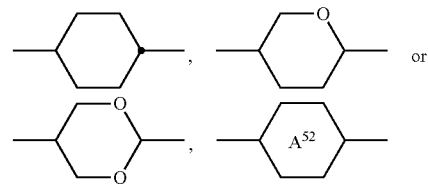

or to

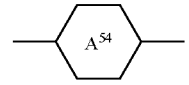

independently of one another, denote

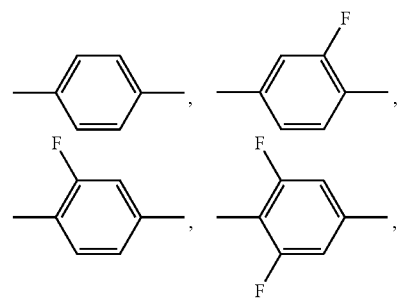

-continued

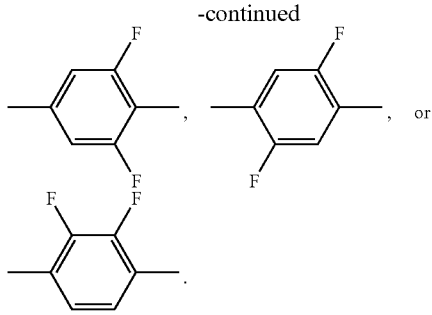

The compounds of the formula V are preferably selected from the group of the compounds of the formulae V-1 to V-3, V-1
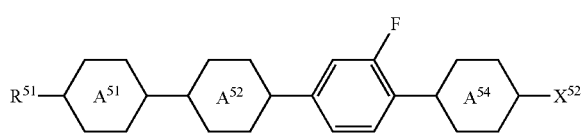

V-2
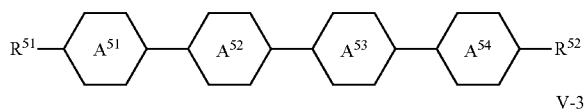

V-3
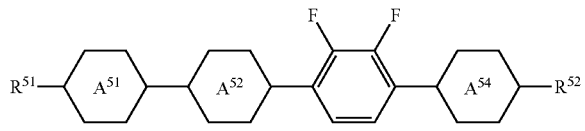

wherein the parameters have the respective meanings indicated above under formula V and preferably
one of

to

denotes

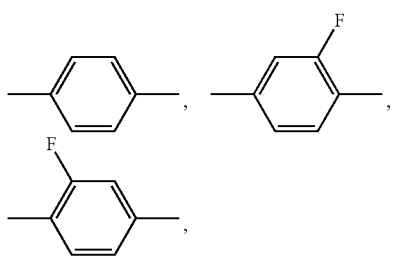

and
wherein
R$^{51}$ has the meaning indicated above and preferably denotes C$_n$H$_{2n+1}$ or CH$_2$=CH—(CH$_2$)$_z$,
R$^{52}$ has the meaning indicated above and preferably denotes C$_m$H$_{2m+1}$ or O—C$_m$H$_{2m+1}$ or (CH$_2$)$_z$—CH=CH$_2$,
X$^{52}$ has the meaning indicated above,
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{51}$ and R$^{52}$) here are, in particular, (C$_n$H$_{2n+1}$ and C$_m$H$_{2m+1}$) and (C$_n$H$_{2n+1}$ and O—C$_m$H$_{2m+1}$).

The compounds of the formula V-1 are preferably selected from the group of the compounds of the formulae V-1a to V-1e, more preferably these compounds of the formula V-1 predominantly consist, even more preferably essentially consist and very particularly preferably completely consist thereof:

V-1a
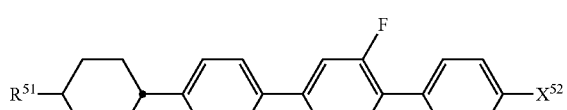

V-1b
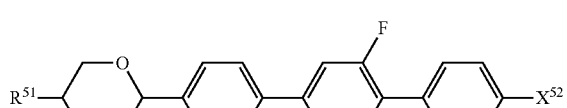

V-1c
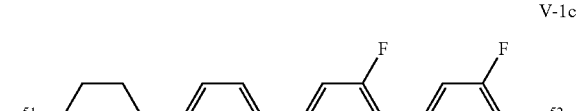

V-1d
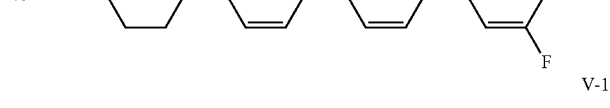

V-1e
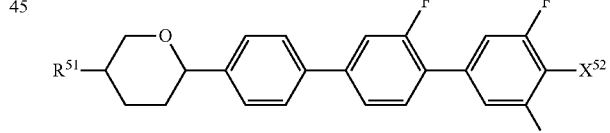

wherein the parameters have the meaning given above and preferably
R$^{51}$ has the meaning indicated above and preferably denotes C$_n$H$_{2n+1}$, and
n denotes an integer in the range from 0 to 15, preferably in the range from 1 to 7 and particularly preferably 1 to 5, and
X$^{52}$ preferably denotes F or Cl.

The compounds of the formula V-2 are preferably selected from the group of the compounds of the formulae V-2a and V-2b, V-2a V-2b

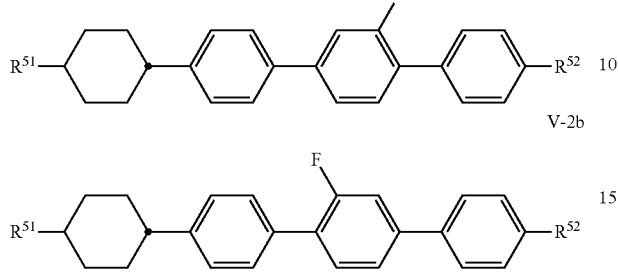

wherein
R$^{51}$ has the meaning indicated above and preferably denotes C$_n$H$_{2n+1}$ or CH$_2$=CH—(CH$_2$)$_z$, and
R$^{52}$ has the meaning indicated above and preferably denotes C$_m$H$_{2m+1}$ or O—C$_m$H$_{2m+1}$ or (CH$_2$)$_z$—CH=CH$_2$, and wherein
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{51}$ and R$^{52}$) here is, in particular, (C$_n$H$_{2n+1}$ and C$_m$H$_{2m+1}$).

The compounds of the formula V-3 are preferably compounds of the formulae V-3a and V-3b:

V-3a

V-3b

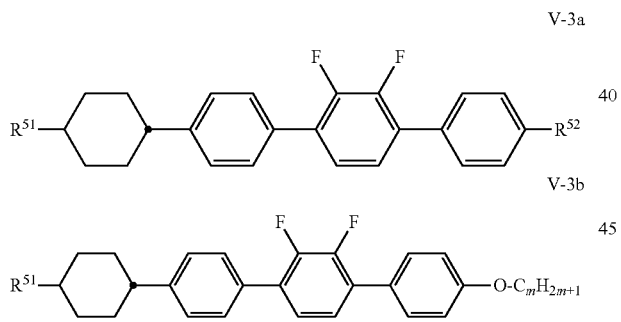

wherein
R$^{51}$ has the meaning indicated above and preferably denotes C$_n$H$_{2n-F1}$ or CH$_2$=CH—(CH$_2$)$_z$, and
R$^{52}$ has the meaning indicated above and preferably denotes C$_m$H$_{2m+1}$ or (CH$_2$)$_z$—CH=CH$_2$, and wherein
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{51}$ and R$^{52}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and O—C$_m$H$_{2m+1}$).

The media in accordance with the present invention optionally comprise one or more compounds of the formula VI

VI

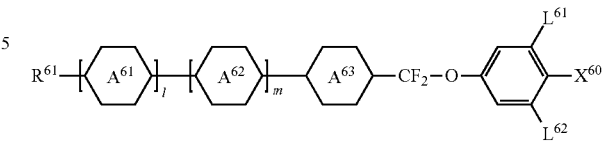

wherein
R$^{61}$, independently of each other, denote alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and R$^2$ and R$^3$ preferably are alkyl or alkenyl,

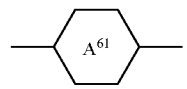

to

are independently of each other

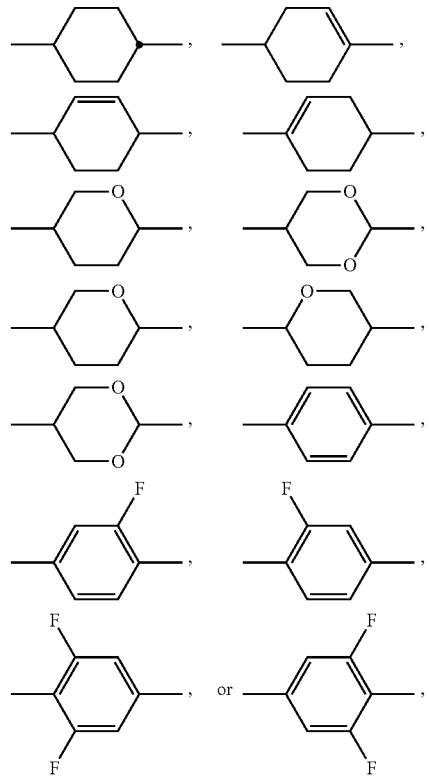

preferably

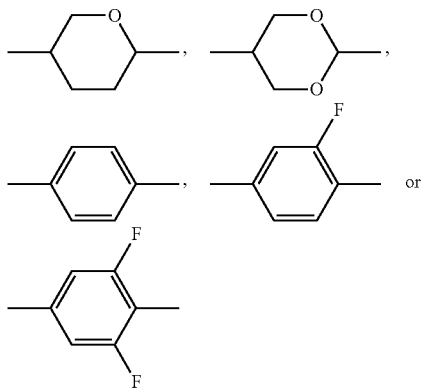

L$^{61}$, L$^{62}$ denote independently of each other, H or F, preferably L$^{61}$ and/or L$^{62}$ is F, X$^{61}$ denotes halogen, halogenated alkyl or alkoxy with 1 to 3 C-atoms or halogenated alkenyl or alkenyloxy with 2 or 3 C-atoms, preferably F, Cl, —OCF$_3$ or —CF$_3$, most preferably F, Cl or —OCF$_3$, l, m denote independently of each other, 0 or 1.

The compounds of formula VI are preferably selected from formula VI-1

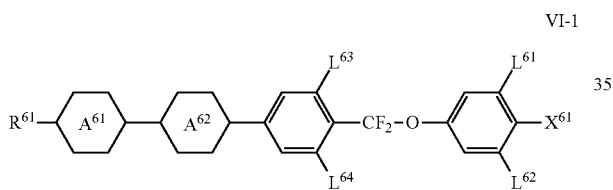

VI-1 wherein the parameters have the respective meanings given under formula VI and L$^{63}$ and L$^{64}$ denote H or F, preferably F.

In a preferred embodiment of the present invention the compounds of formula VI are selected from compounds of formula VI-1 wherein L$^{61}$, L$^{62}$, L$^{63}$ and L$^{64}$ all are F.

Preferably the compounds of formula VI-1 are selected from the group of compounds of formulae VI-1a to VI-1d, particularly preferably from compounds of formula VI-1d,

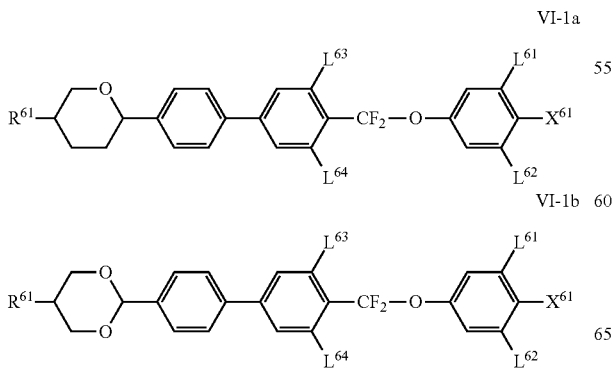

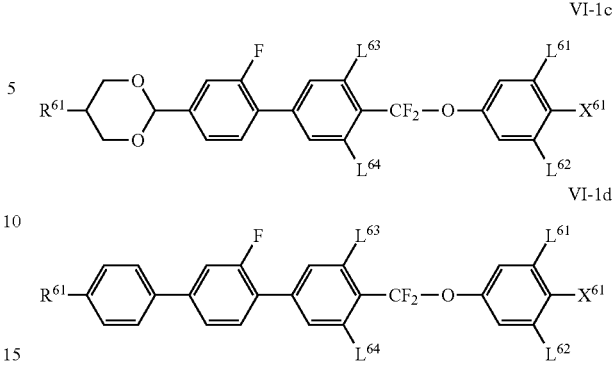

wherein the parameters have the respective meanings given above.

The liquid crystal medium according to the present invention may optionally additionally comprise one or more biphenyl compounds selected from the group consisting of the following formulae:

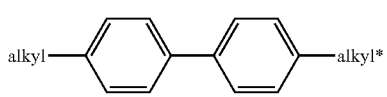
VII-1

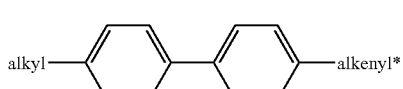
VII-2

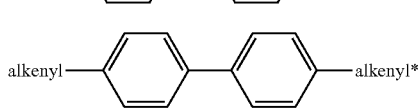
VII-3 wherein
alkyl and alkyl* each, independently of one another, denote a straight-chain alkyl radical having 1-6 C atoms, and
alkenyl and
alkenyl* each, independently of one another, denote a straight-chain alkenyl radical having 2-6 C atoms.

Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

The compounds of the formula VII-2 are particularly preferred.

The compounds of the formulae VII-1 to VII-3 are preferably selected from the group consisting of the following sub-formulae:

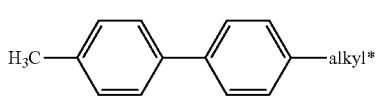
VII-1a

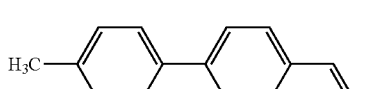
VII-2a

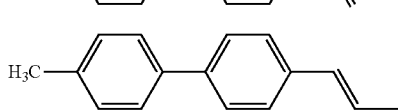
VII-2b

-continued

VII-2c
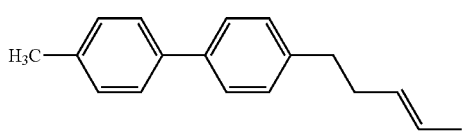

in which alkyl* denotes an alkyl radical having 1-6 C atoms. The medium according to the invention particularly preferably comprises one or more compounds of the formulae VII-1a and/or VII-2c.

The liquid crystal medium according to the present invention may optionally additionally comprise one or dielectrically neutral compounds selected from the group consisting of the following formulae:

VIII
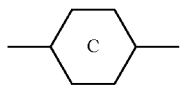

in which the individual radicals have the following meanings:

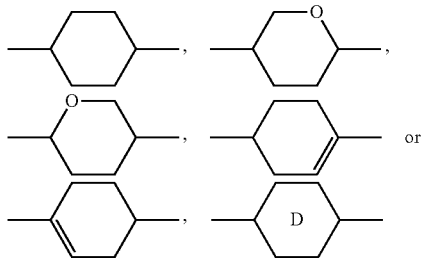 denotes

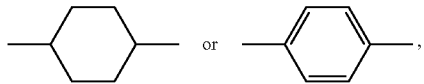 denotes $R^3$ and $R^4$ each, independently of one another, denote alkyl having 1 to 12 C atoms, in which, in addition, one or two non-adjacent $CH_2$ groups may be replaced by —O—, —CH=CH—, —CO—, —O—CO— or —CO—O— in such a way that O atoms are not linked directly to one another, $Z^y$ denotes —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond.

The compounds of the formula VIII- are preferably selected from the group consisting of the following sub-formulae:

VIII-1
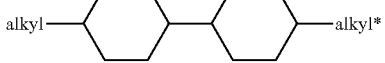

VIII-2
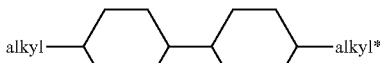

VIII-3
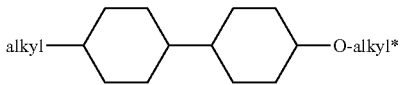

VIII-4
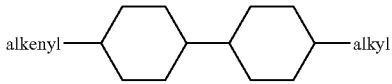

VIII-5
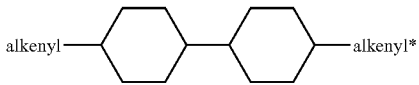

VIII-6
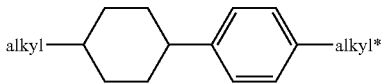

VIII-7
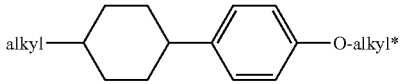

VIII-8
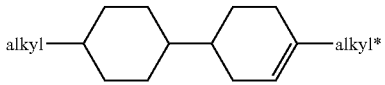

VIII-9
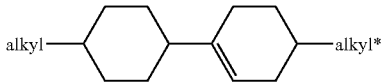

VIII-10
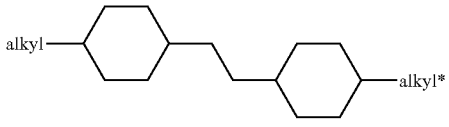

wherein alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2$=CH—, $CH_2$=CHCH$_2$CH$_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Especially preferred are compounds of formula VIII-1 and VIII-3.

Particularly preferred compounds of formula VIII- are selected from the following sub-formulae:

VIII-1a

VIII-1b
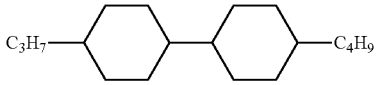

-continued

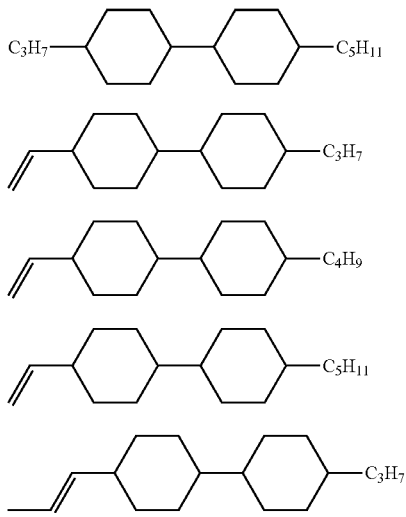

wherein the propyl, butyl and pentyl groups are straight-chain groups.

Most preferred are compounds of formula VIII-1a and VIII-3a.

Another subject of the present invention are compounds of formula A-2

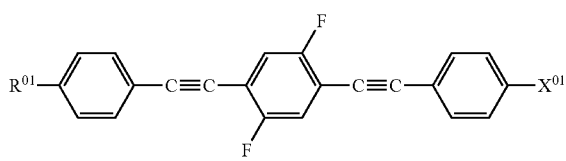

A-2 wherein

R$^{01}$ has the meaning indicated in claim 1 and

X$^{01}$ denotes F, Cl, —NCS, —SF$_5$, fluorinated alkyl, fluorinated alkenyl or fluorinated alkoxy having 1 to 7 C atoms.

Preferably, the compounds of formula A-2 are selected from the compounds of the following sub-formulae A-2a to A-2f

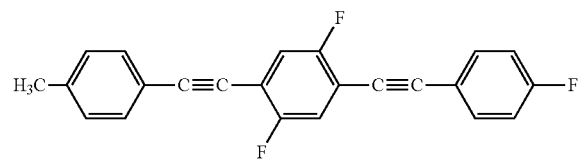

A-2a

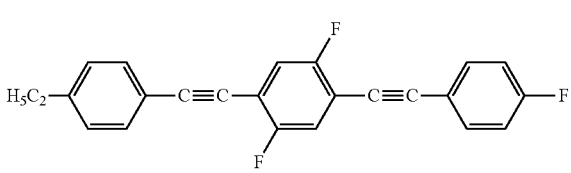

A-2b

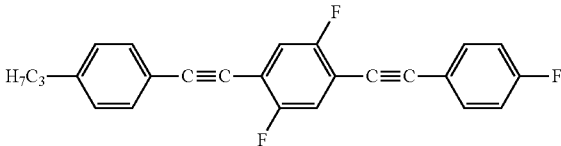

A-2c

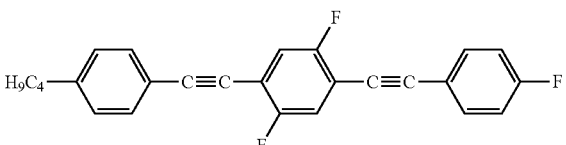

A-2d

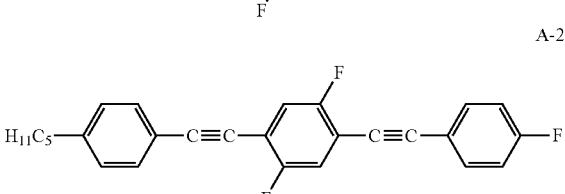

A-2e

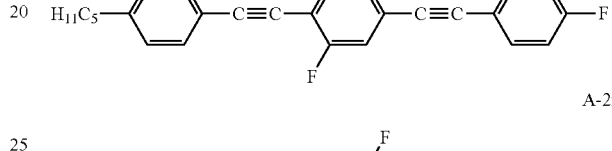

A-2f

The compounds of the general formula A can be prepared by methods known per se, as described in the literature (for example in the standard works, such as Houben-Weyl, Methoden der organischen Chemie [Methods of Organic Chemistry], Georg-Thieme-Verlag, Stuttgart), under reaction conditions which are known and suitable for the said reactions. Use can be made here of variants known per se which are not mentioned here in greater detail.

If desired, the starting materials can also be formed in situ by not isolating them from the reaction mixture, but instead immediately converting them further into the compounds of the general formula I.

The syntheses of various compounds of the general formula I according to the invention will be illustrated in the examples. The starting substances can be obtained by generally accessible literature procedures or are commercially available. The reaction types described are to be regarded as known from the literature.

Particularly preferred synthetic routes to the compounds of the invention are described below (schemes 1 and 2).

Starting from 4-bromo-2,5-difluoro-1-iodobenzene (2) compounds A can be obtained in two subsequent Sonogashira coupling steps using substituted phenyl acetylenes 1. Alternatively, for compounds with equal substituents R$^{01}$ and L$^{01}$ the coupling can also be performed in only one step.

Scheme 1.

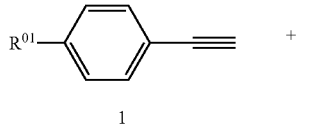

1

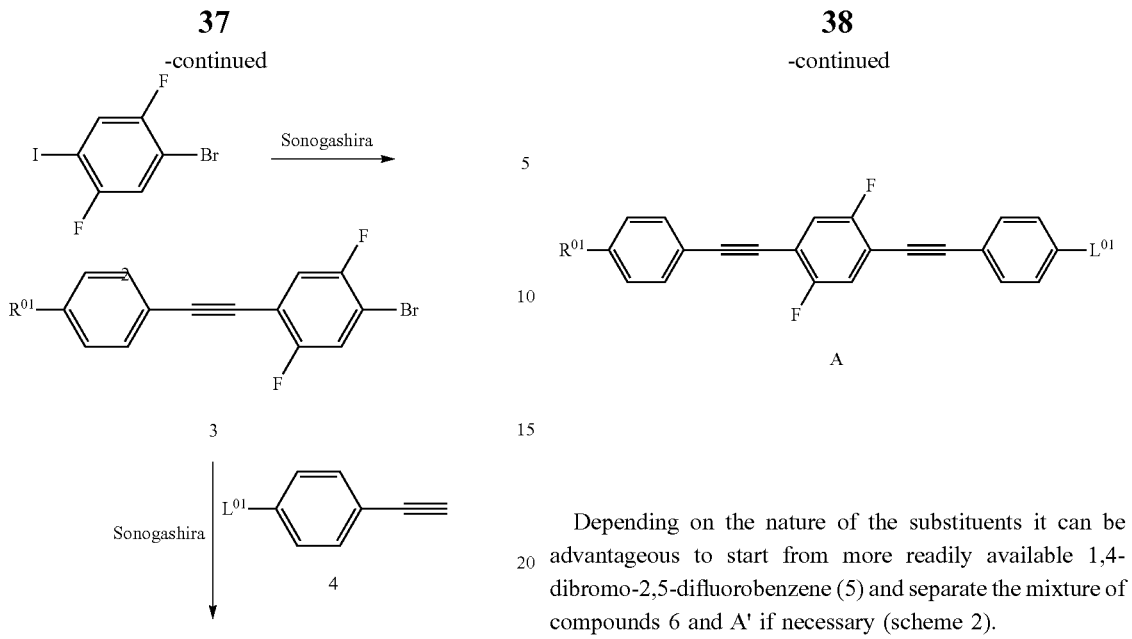
Depending on the nature of the substituents it can be advantageous to start from more readily available 1,4-dibromo-2,5-difluorobenzene (5) and separate the mixture of compounds 6 and A' if necessary (scheme 2).
Scheme 2.
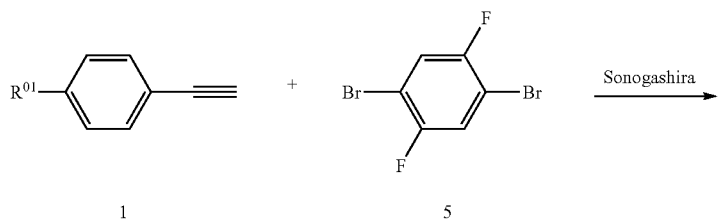
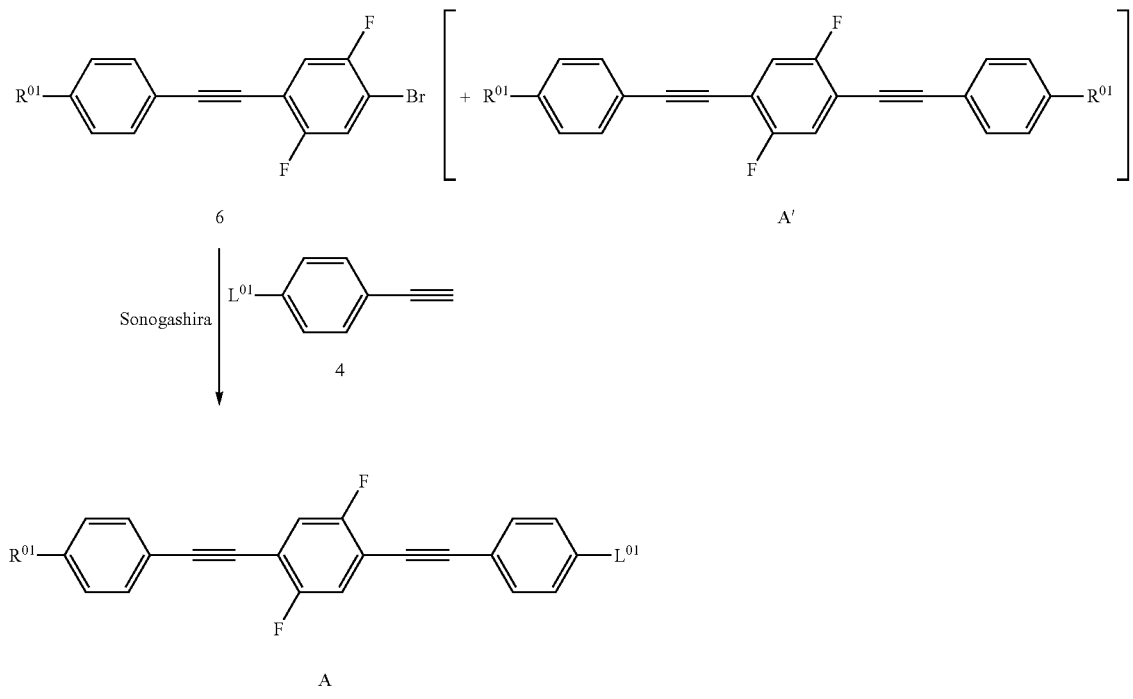

In a preferred embodiment of the present invention, the medium comprises one or more compounds of the formulae A and II.

In another preferred embodiment of the present invention, the medium comprises one or more compounds of the formulae A, I and II.

In a preferred embodiment of the present invention, the medium comprises one or more dielectrically positive compounds of the formula I-1 having a dielectric anisotropy of greater than 3.

In a first preferred embodiment the compounds of the formula II are preferably selected from compounds of the formula II-2a and II-1a.

In a second preferred embodiment the compounds of the formula II are preferably selected from compounds of the formula II-2a and II-1a.

In a third preferred embodiment the compounds of the formula IIare preferably selected from compounds of the formulae II-6, preferably II-6d, or II-6d and II-6a.

In a fourth preferred embodiment the medium additionally comprises one or more compounds of the formula II-1b-1.

According to the present invention the compounds of the formula A are preferably used in a total concentration of 1 to 30%, preferably 5 to 20% and particularly preferably 10 to 15%.

In accordance with the present invention, the individual compounds of the formula I are preferably used in a total concentration of 0 to 30%, more preferably 5% to 25%, even more preferably 10% to 25% and very preferably 15% to 25% of the mixture as a whole.

The compounds of the formula IIare preferably used in a total concentration of 30% to 99%, more preferably 35% to 95%, even more preferably 40% to 90% and very preferably 40% to 85% of the mixture as a whole.

The compounds of the formula II-2a are preferably used in a total concentration of 20% to 70%, more preferably 30% to 65%, even more preferably 40% to 60% and very preferably 45% to 55% of the mixture as a whole.

The compounds of the formula II-1a are preferably used in a total concentration of 5% to 50%, more preferably 15% to 40%, even more preferably 20% to 35% and very preferably 25% to 30% of the mixture as a whole.

The compounds of the formula II-1b-1 are preferably used in combination with compounds 11-2a total concentration of 1% to 30%, more preferably 5% to 30%, even more preferably 10% to 20% and very preferably 14% to 17% of the mixture as a whole. The compounds of the formula II-1b-1 are preferably used in combination with compounds 11-6 total concentration of 10% to 60%, more preferably 15% to 50%, even more preferably 20% to 40% and very preferably 30% to 35% of the mixture as a whole.

The compounds of the formula II-6 are preferably used in a total concentration of 20% to 70%, more preferably 30% to 65%, even more preferably 40% to 60% and very preferably 45% to 55% of the mixture as a whole.

The liquid-crystal media preferably comprise, preferably predominantly consist of and very preferably completely consist of in total 50% to 100%, more preferably 60% to 100% and very preferably 70% to 100% of the compounds of the formulae A, I, and II, or of the compounds A and II.

The liquid-crystalline media in accordance with the present application preferably comprise in total 0 to 40%, preferably 0 to 30% and particularly preferably 5 to 25%, of compounds of the formula IV.

The liquid-crystalline media in accordance with the present application preferably comprise in total 5 to 30%, preferably 10 to 25% and particularly preferably 15 to 20%, of compounds of the formula V.

The proportion of compounds of formula VI in the mixture is preferably in the range from 0% to 10%, more preferably from 2% to 8% and particularly preferably from 3% to 6%.

The proportion of the biphenyls of the formulae VII-1 to VII-3 in the mixture is preferably in the range from 0% to 15%, more preferably from 1% to 10% and particularly preferably from 3% to 8%.

The proportion of the compounds of the formulae VIII-1 to VIII-10 in the mixture is preferably in the range from 0% to 20%, more preferably from 5% to 18% and particularly preferably from 10% to 16%.

Furthermore it is preferred that the media according to the present invention comprise further mesogenic compounds known to the skilled person from the state of the art in order to adapt the mixture properties according to the particular application. Preferred compounds are shown in table D but other mesogenic compounds which are not explicitly mentioned above can optionally and advantageously also be used in the media in accordance with the present invention. Such compounds are known to the person skilled in the art.

The definitions of the abbreviations (acronyms) are likewise indicated below in Table D or are evident from Tables A to C.

The liquid-crystal media in accordance with the present invention preferably have a clearing point of 90° C. or more, more preferably 120° C. or more, particularly preferably 150° C. or more.

The nematic phase of the media in accordance with the invention preferably extends at least from −10° C. or less to 90° C. or more, more preferably at least from −20° C. or less to 120° C. or more, most preferably at least from −30° C. or less to 150° C. or more.

The expression "to have a nematic phase" here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a layer thickness of 5 μm for at least 100 hours. At high temperatures, the clearing point is measured in capillaries by conventional methods.

The Δε of the liquid-crystal medium in accordance with the invention, at 1 kHz and 20° C., is preferably 1 or more, more preferably 2 or more and very preferably 3 or more.

In some embodiments, however, liquid crystals having a negative value of the dielectric anisotropy can also advantageously be used.

The Δn of the liquid-crystal media in accordance with the present invention, at 589 nm ($Na_D$) and 20° C., is preferably in the range from 0.200 or more to 0.90 or less, more preferably in the range from 0.250 or more to 0.90 or less, even more preferably in the range from 0.300 or more to 0.85 or less and very particularly preferably in the range from 0.350 or more to 0.800 or less.

Furthermore, the liquid-crystal media according to the invention are characterised by high anisotropy values in the microwave range. The birefringence at about 8.3 GHz is, for example, preferably 0.14 or more, particularly preferably 0.15 or more, particularly preferably 0.20 or more, particularly preferably 0.25 or more and very particularly preferably 0.30 or more. In addition, the birefringence is preferably 0.80 or less.

The Figure of Merit (FoM) η(μ-waves)/tan(δ) of the preferred liquid-crystal materials is 5 or more, preferably 10 or more, and particularly preferably 20 or more.

In the present application, the expression dielectrically positive describes compounds or components where Δε>3.0, dielectrically neutral describes those where −1.5≤Δε≤3.0 and dielectrically negative describes those where Δε<−1.5. Δε is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

Δε is defined as $(\varepsilon_\parallel - \varepsilon_\perp)$, while $\varepsilon_{ave.}$ is $(\varepsilon_\parallel + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy (Δn) is determined at a wavelength of 589.3 nm. The dielectric anisotropy (Δε) is determined at a frequency of 1 kHz. The threshold voltages, as well as all other electro-optical properties, are determined using test cells produced at Merck KGaA, Germany. The test cells for the determination of Δε have a cell thickness of approximately 20 μm. The electrode is a circular ITO electrode having an area of 1.13 cm² and a guard ring. The orientation layers are SE-1211 from Nissan Chemicals, Japan, for homeotropic orientation ($\varepsilon_\parallel$) and polyimide AL-1054 from Japan Synthetic Rubber, Japan, for homogeneous orientation ($\varepsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystalline media are investigated with respect to their properties in the microwave frequency range as described in A. Penirschke, S. Müller, P. Scheele, C. Weil, M. Wittek, C. Hock and R. Jakoby: "Cavity Perturbation Method for Characterization of Liquid Crystals up to 35 GHz", 34th European Microwave Conference—Amsterdam, pp. 545-548.

Compare in this respect also A. Gaebler, F. Gölden, S. Müller, A. Penirschke and R. Jakoby "Direct Simulation of Material Permittivites . . . ", 12MTC 2009—International Instrumentation and Measurement Technology Conference, Singapore, 2009 (IEEE), pp. 463-467, and DE 10 2004 029 429 A, in which a measurement method is likewise described in detail.

The dielectric anisotropy in the microwave region is defined as $$\Delta\varepsilon_r = (\varepsilon_{r,\parallel} - \varepsilon_{r,\perp}).$$

The tuneability (τ) is defined as $$\tau \equiv (\Delta\varepsilon_r / \varepsilon_{r,\parallel}).$$

The material quality (η) is defined as $$\eta \equiv (\tau / \tan\delta_{\varepsilon r,max}), \text{ where}$$

the maximum dielectric loss is $$\tan\delta_{\varepsilon r,max} = \max.\{\tan\delta_{\varepsilon r,\perp}; \tan\delta_{\varepsilon r,\parallel}\}.$$

The liquid crystal is introduced into a polytetrafluoroethylene (PTFE) capillary. The capillary has an internal radius of 180 μm and an external radius of 350 μm. The effective length is 2.0 cm. The filled capillary is introduced into the centre of the cavity with a resonance frequency of 30 GHz. This cavity has a length of 6.6 mm, a width of 7.1 mm and a height of 3.6 mm. The input signal (source) is then applied, and the result of the output signal is recorded using a commercial vector network analyser.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in A. Penirschke, S. Müller, P. Scheele, C. Weil, M. Wittek, C. Hock and R. Jakoby: "Cavity Perturbation Method for Characterization of Liquid Crystals up to 35 GHz", 34th European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnets is set correspondingly and then rotated correspondingly through 90°.

Preferred components are phase shifters, varactors, wireless and radio wave antenna arrays, matching circuit adaptive filters and others.

In the present application, the term compounds is taken to mean both one compound and a plurality of compounds, unless expressly stated otherwise.

The liquid crystals employed are either individual substances or mixtures. They preferably have a nematic phase.

The term "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, wherein n and m each, independently of one another, denote 1 to 10. Preferably, n is 1 and m is 1 to 6.

Compounds containing a vinyl end group and compounds containing a methyl end group have low rotational viscosity.

In the present application, both high-frequency technology and hyperfrequency technology denote applications having frequencies in the range from 1 MHz to 1 THz, preferably from 1 GHz to 500 GHz, more preferably 2 GHz to 300 GHz, particularly preferably from about 5 to 150 GHz.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called premixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also referred to as acronyms. In these acronyms, the chemical formulae are abbreviated as follows using Tables A to C below. All groups $C_nH_{2n+1}$, $C_m H_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, respectively, in each case having n, m or l C atoms. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

TABLE A

Ring elements

C

D                          DI

A                          AI

P

TABLE A-continued
| Ring elements | | | |
|---|---|---|---|
| P(1) | 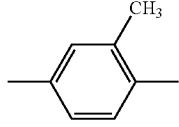 | P(1)I | 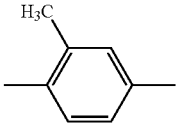 |
| P(c3) | 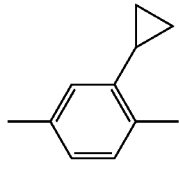 | P(c3)I | 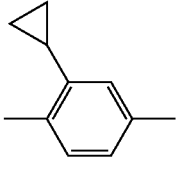 |
| G | 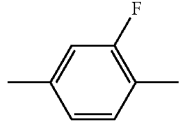 | GI | 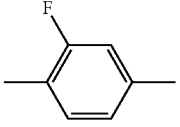 |
| U | 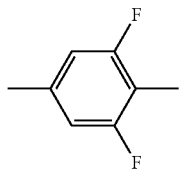 | UI | 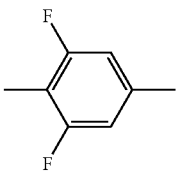 |
| Y | 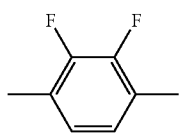 | X | 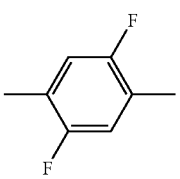 |
| M | 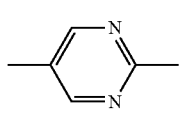 | MI | 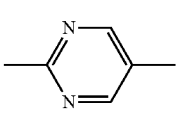 |
| N | 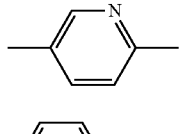 | NI | 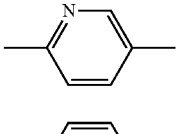 |
| Np | 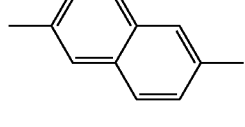 | iNp | 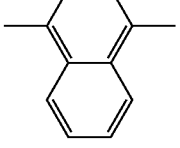 |
| N3f | 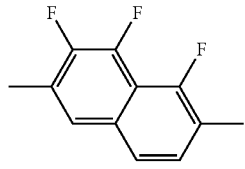 | N3fI | 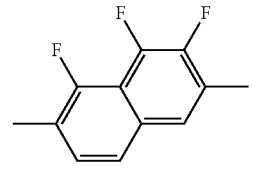 |
| tH | 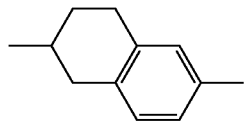 | tHI | 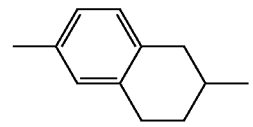 |

TABLE A-continued

| | Ring elements | | |
|---|---|---|---|
| tH2f | [structure: tetrahydronaphthalene with 2 F] | tH2fI | [structure: tetrahydronaphthalene with 2 F] |
| dH | [structure: decahydronaphthalene] | | |
| K | [structure: indane with 3 F] | KI | [structure: indane with 3 F] |
| L | [structure: cyclohexene] | LI | [structure: cyclohexene] |
| F | [structure: fluorocyclohexene] | FI | [structure: fluorocyclohexene] |

TABLE B

| | Linking groups | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |

TABLE B-continued

| | Linking groups | | |
|---|---|---|---|
| B | —CF=CF— | Q | —CF$_2$—O— |
| T | —C≡C— | QI | —O—CF$_2$— |
| W | —CF$_2$CF$_2$— | | |

TABLE C

| End groups | | | |
|---|---|---|---|
| Left-hand side | | Right-hand side | |
| Use alone | | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |

TABLE C-continued

| End groups | |
|---|---|
| Left-hand side | Right-hand side |
| Use together with others | |
| -...A...-   —C≡C— | -...A...   —C≡C— |
| -...V...-   CH=CH— | -...V...   —CH=CH— |
| -...Z...-   —CO—O— | -...Z...   —CO—O— |
| -...ZI...-  —O—CO— | -...ZI...  —O—CO— |
| -...K...-   —CO— | -...K...   —CO— |
| -...W...-   —CF=CF— | -...W...   —CF=CF— | wherein n and m each denote integers, and the three dots "..." are placeholders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

Illustrative structures of compounds having two 6-membered rings which are particularly preferably employed:

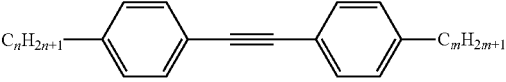

PTP-n-m

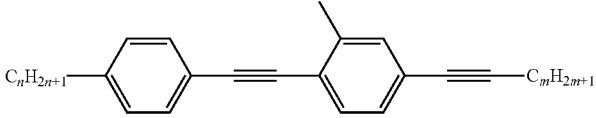

PTP(1)I-n-Am

Illustrative structures of compounds having a naphthaline ring which are particularly preferably employed:

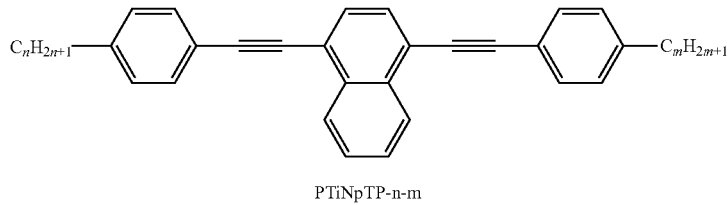

PTiNpTP-n-m

Illustrative structures of compounds having three 6-membered rings which are particularly preferably employed:

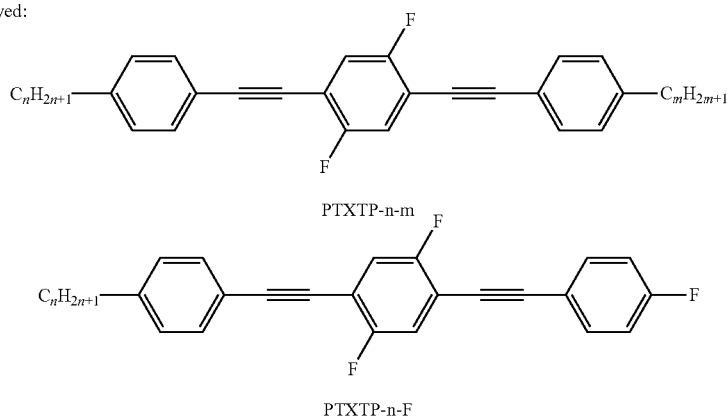

PTXTP-n-m

PTXTP-n-F

TABLE D-continued
Illustrative structures
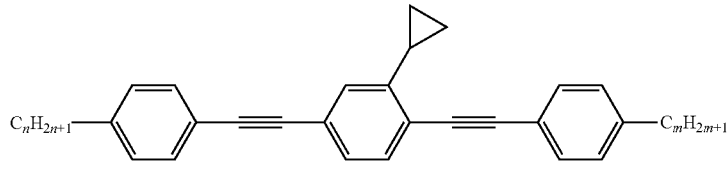
PTP(c3)TP-n-m
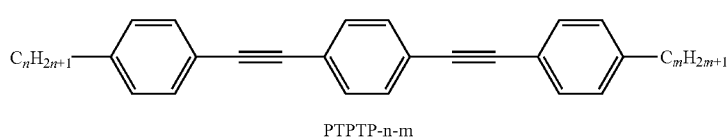
PTPTP-n-m
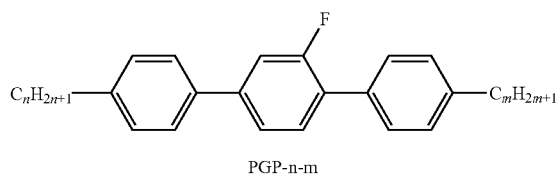
PGP-n-m
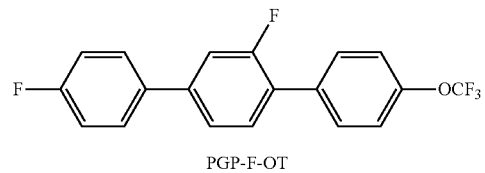
PGP-F-OT
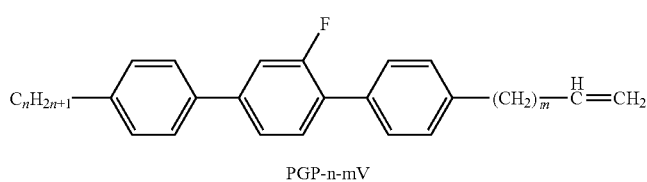
PGP-n-mV
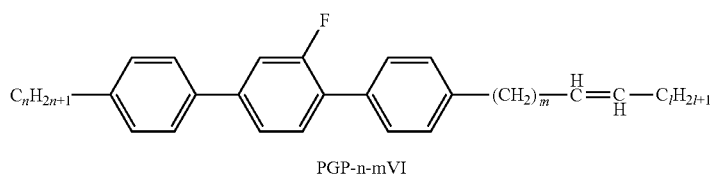
PGP-n-mVI
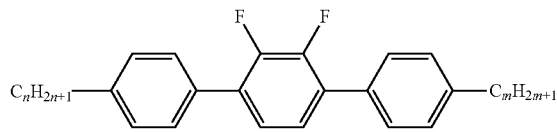
PYP-n-m
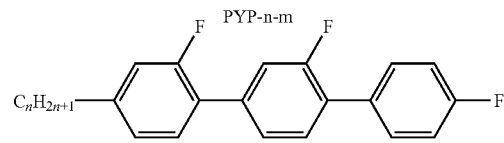
GGP-n-F
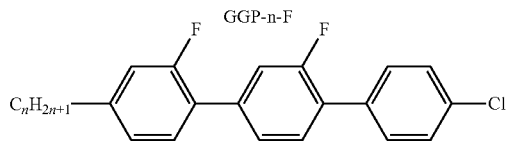
GGP-n-CL TABLE D-continued
Illustrative structures
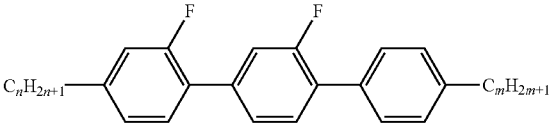
GGP-n-m
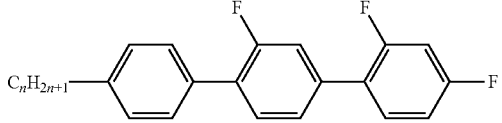
PGIGI-n-F
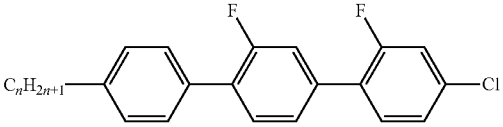
PGIGI-n-CL
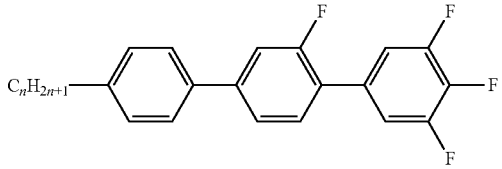
PGU-n-F
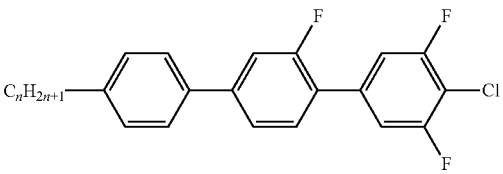
PGU-n-CL
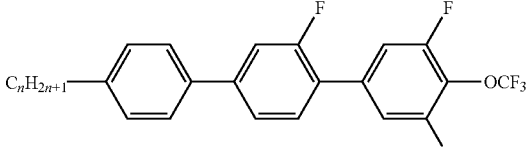
PGU-n-OT
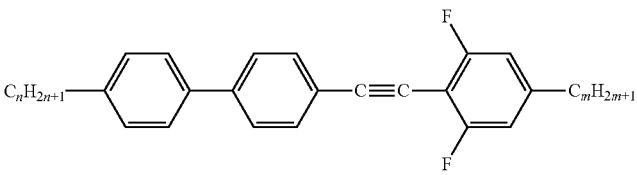
PPTUI-n-m
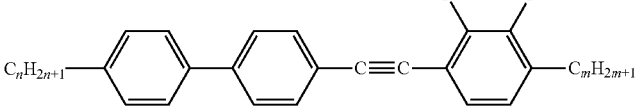
PPTY-n-m TABLE D-continued
Illustrative structures
Illustrative structures of compounds having four 6-membered rings which are particularly preferably employed:
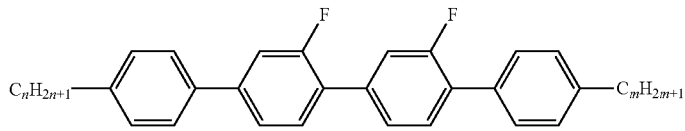
PGGP-n-m
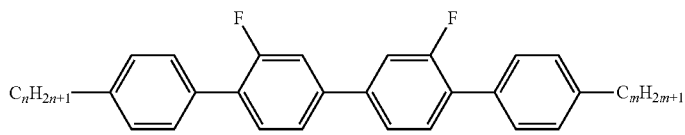
PGIGP-n-m
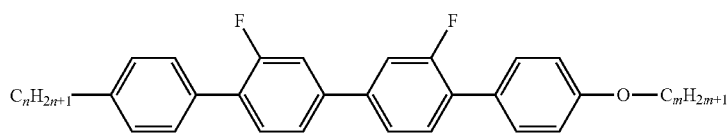
PGIGP-n-Om
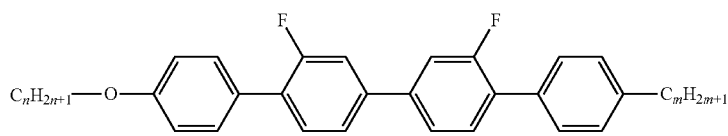
PGIGP-nO-m
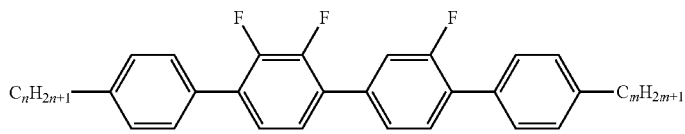
PYGP-n-m
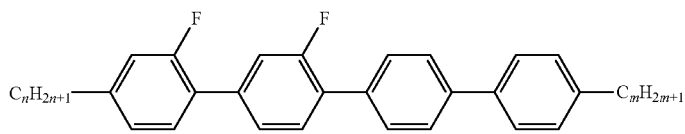
GGPP-n-m
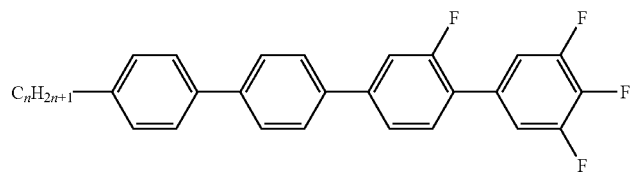
PPGU-n-F
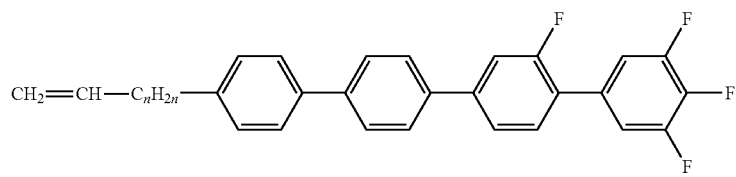
PPGU-Vn-F TABLE D-continued
Illustrative structures
Illustrative structures of dielectrically neutral compounds which are preferably employed:
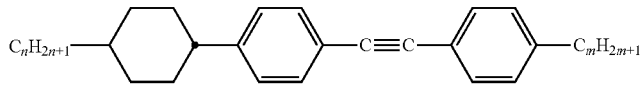
CPTP-n-m
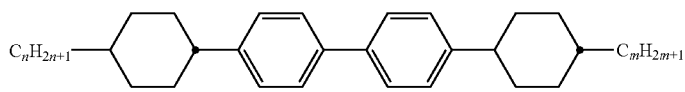
CPPC-n-m
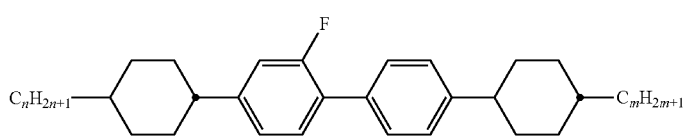
CGPC-n-m
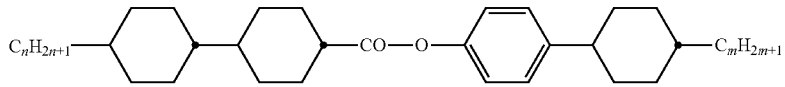
CCZPC-n-m
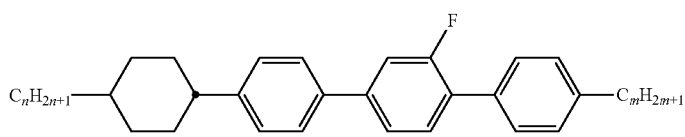
CPGP-n-m
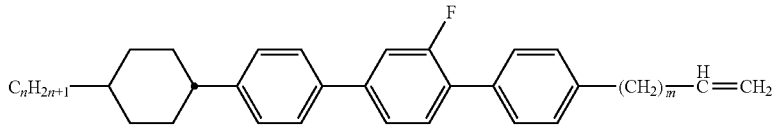
CPGP-n-mV
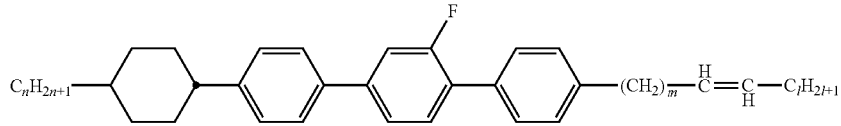
CPGP-n-mVI
Illustrative structures of further compounds which are preferably employed:
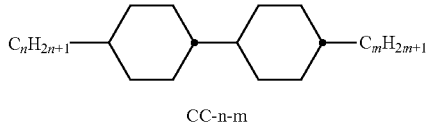
CC-n-m
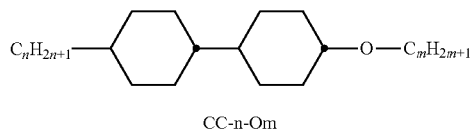
CC-n-Om
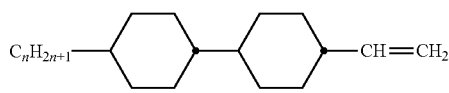

TABLE D-continued
Illustrative structures
CC-n-V
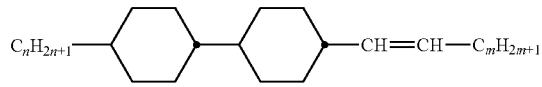
CC-n-Vm
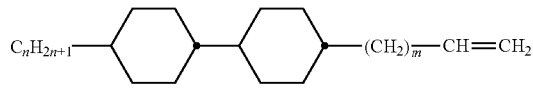
CC-n-mV
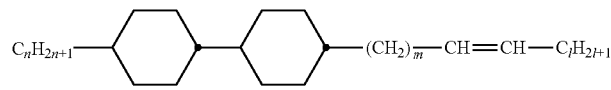
CC-n-mVl
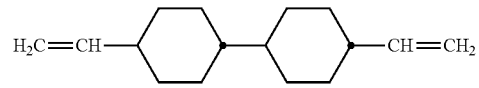
CC-V-V
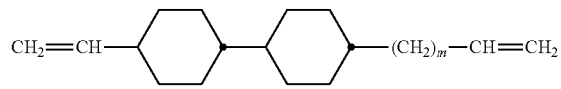
CC-V-mV
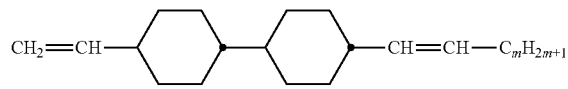
CC-V-Vm
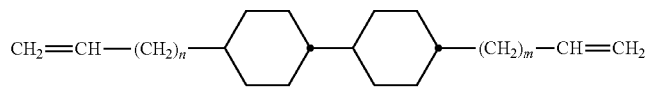
CC-Vn-mV
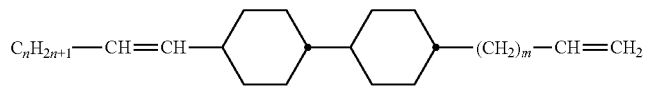
CC-nV-mV
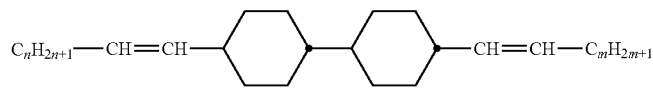
CC-nV-Vm
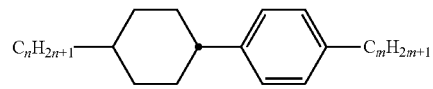
CP-n-m
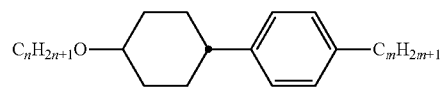
CP-nO-m TABLE D-continued
Illustrative structures
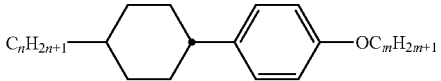
CP-n-Om
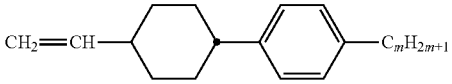
CP-V-m
CP-Vn-m
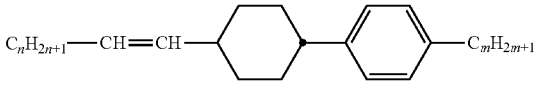
CP-nV-m
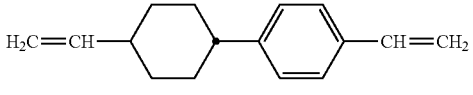
CP-V-V
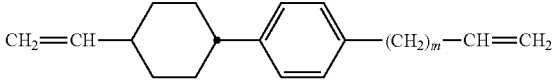
CP-V-mV
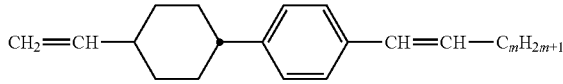
CP-V-Vm
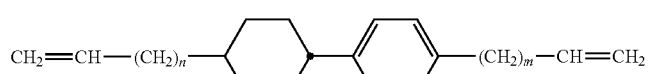
CP-Vn-mV
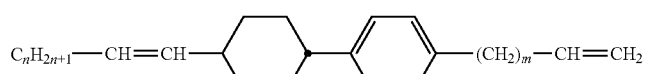
CP-nV-mV
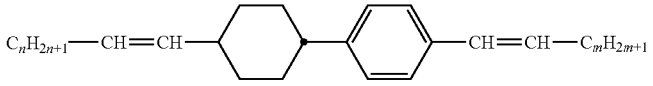
CP-nV-Vm
PP-n-m TABLE D-continued
Illustrative structures
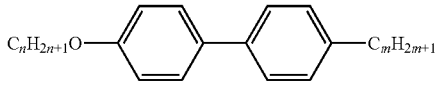
PP-nO-m
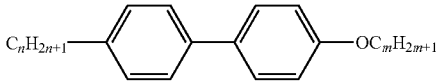
PP-n-Om
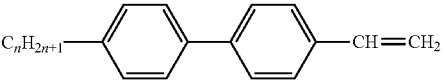
PP-n-V
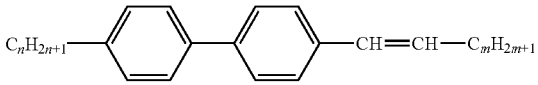
PP-n-Vm
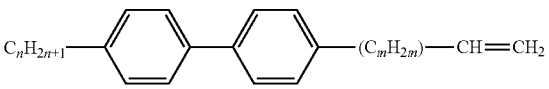
PP-n-mV
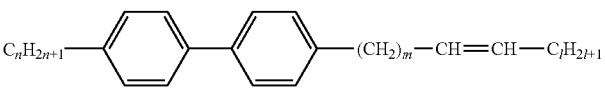
PP-n-mVl
CCP-n-m
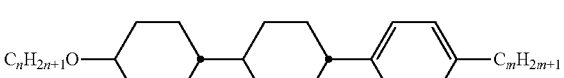
CCP-nO-m
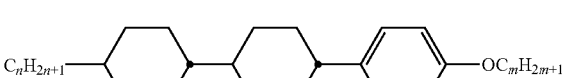
CCP-n-Om
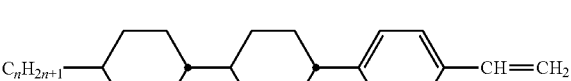
CCP-n-V
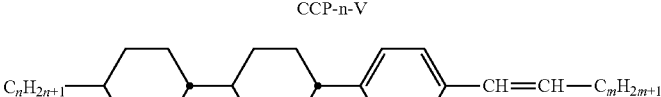
CCP-n-Vm TABLE D-continued
Illustrative structures
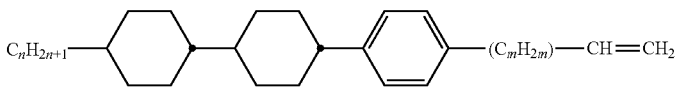
CCP-n-mV
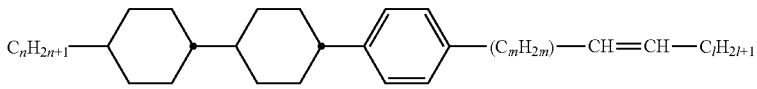
CCP-n-mVI
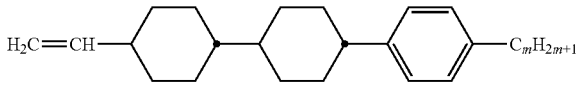
CCP-V-m
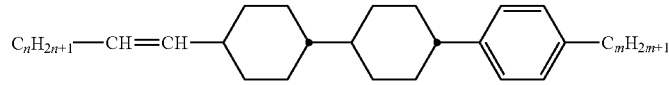
CCP-nV-m
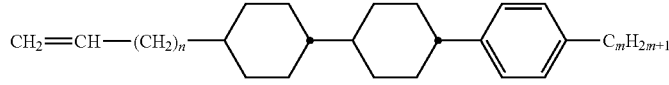
CCP-Vn-m
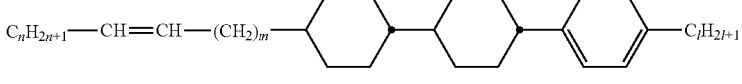
CCP-nVm-I
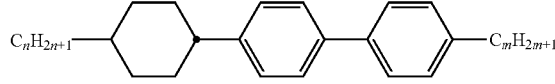
CCP-n-m
CPG-n-m
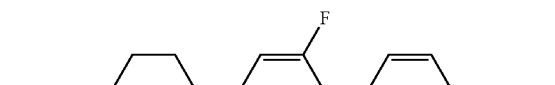
CGP-n-m
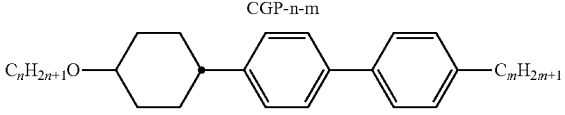
CPP-nO-m
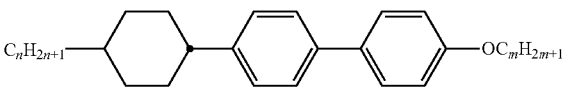
CPP-n-Om TABLE D-continued
Illustrative structures
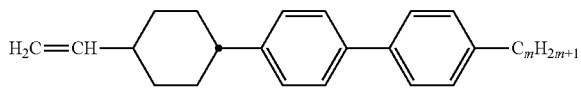
CPP-V-m
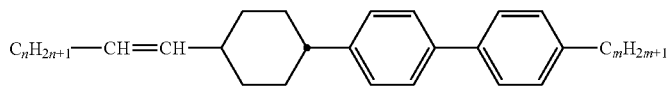
CPP-nV-m
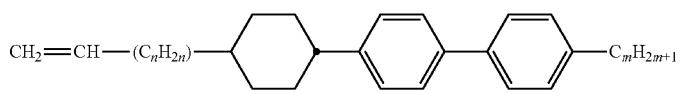
CPP-Vn-m
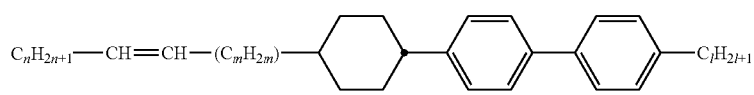
CPP-nVm-l
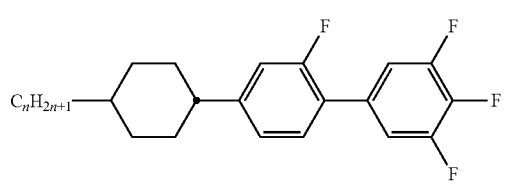
CGU-n-F
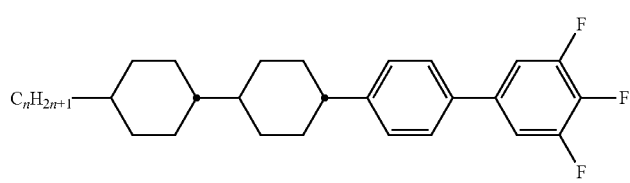
CCPU-n-F
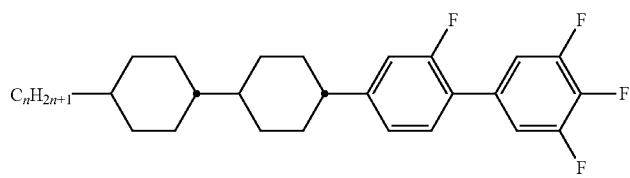
CCGU-n-F
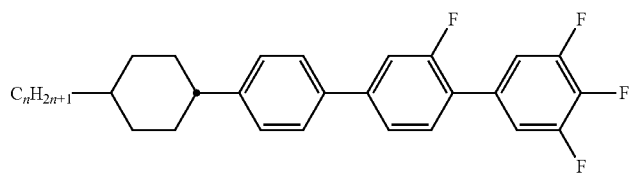
CPGU-n-F TABLE D-continued
Illustrative structures
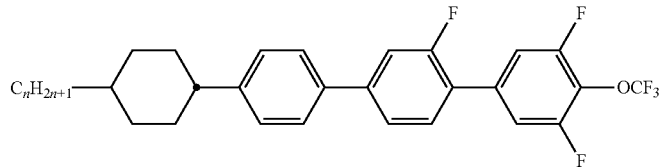
CPGU-n-OT
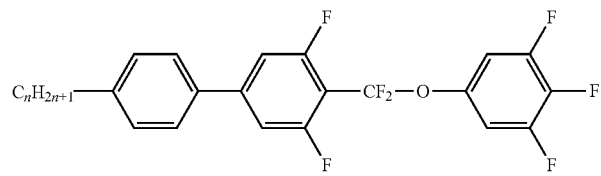
PUQU-n-F
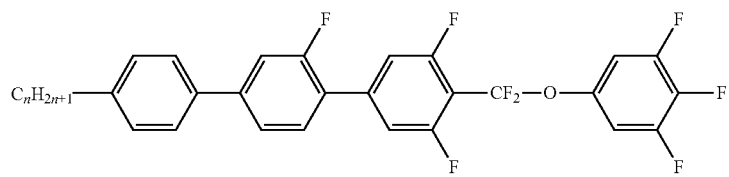
PGUQU-n-F
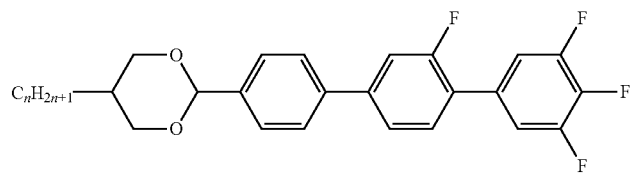
DPGU-n-F
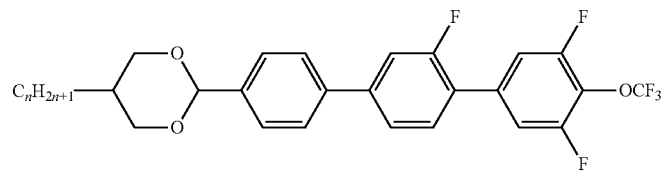
DPGU-n-OT
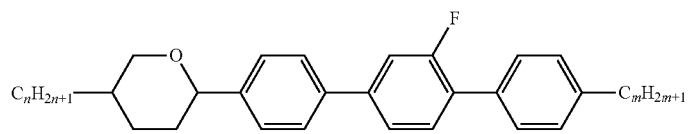
APGP-n-m The following table, Table E, shows illustrative compounds which can be used as stabiliser in the mesogenic media in accordance with the present invention. The total concentration of these and similar compounds in the media is preferably 5% or less.
TABLE E
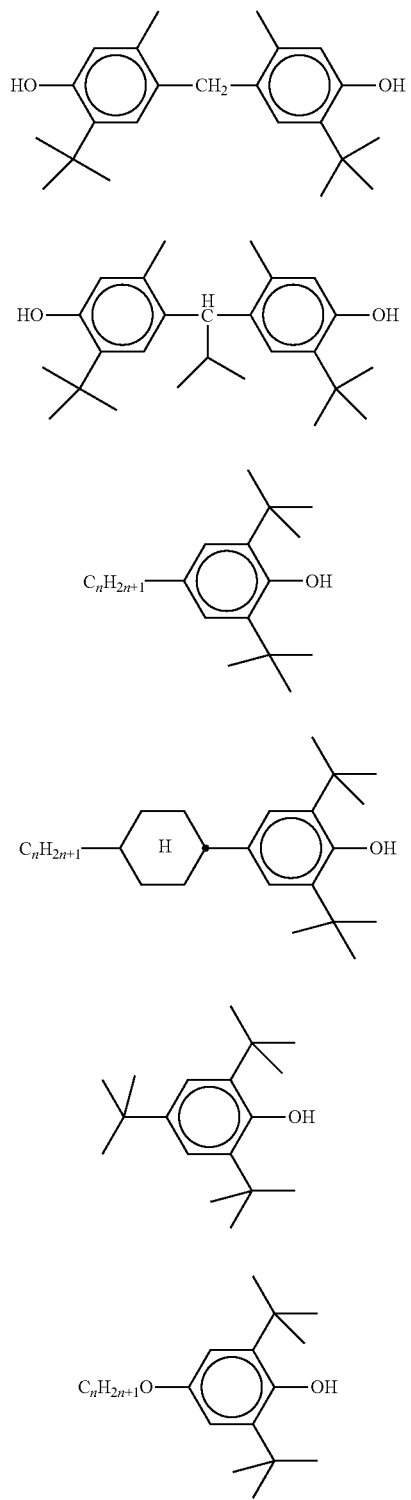
TABLE E-continued
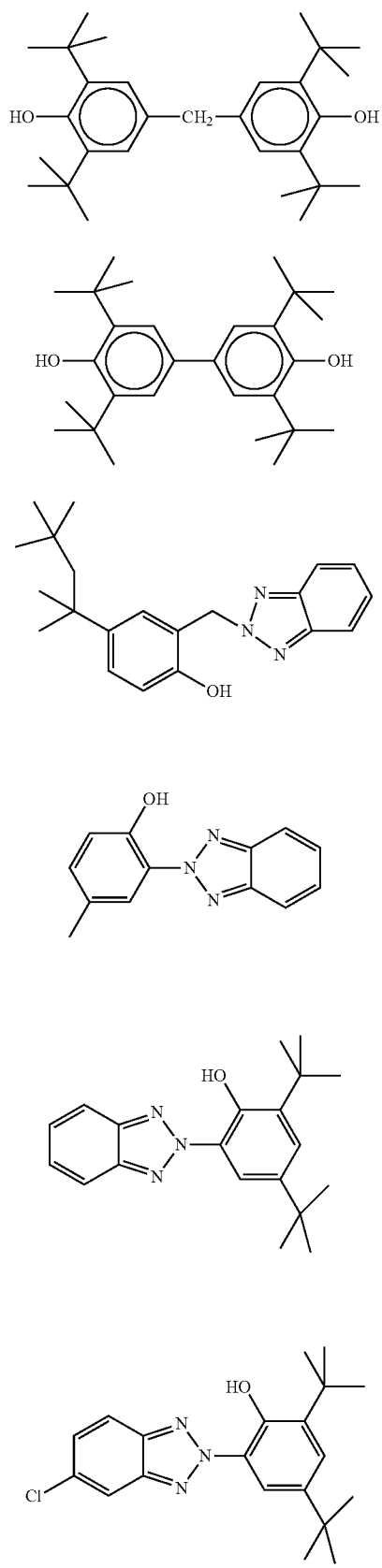

TABLE E-continued
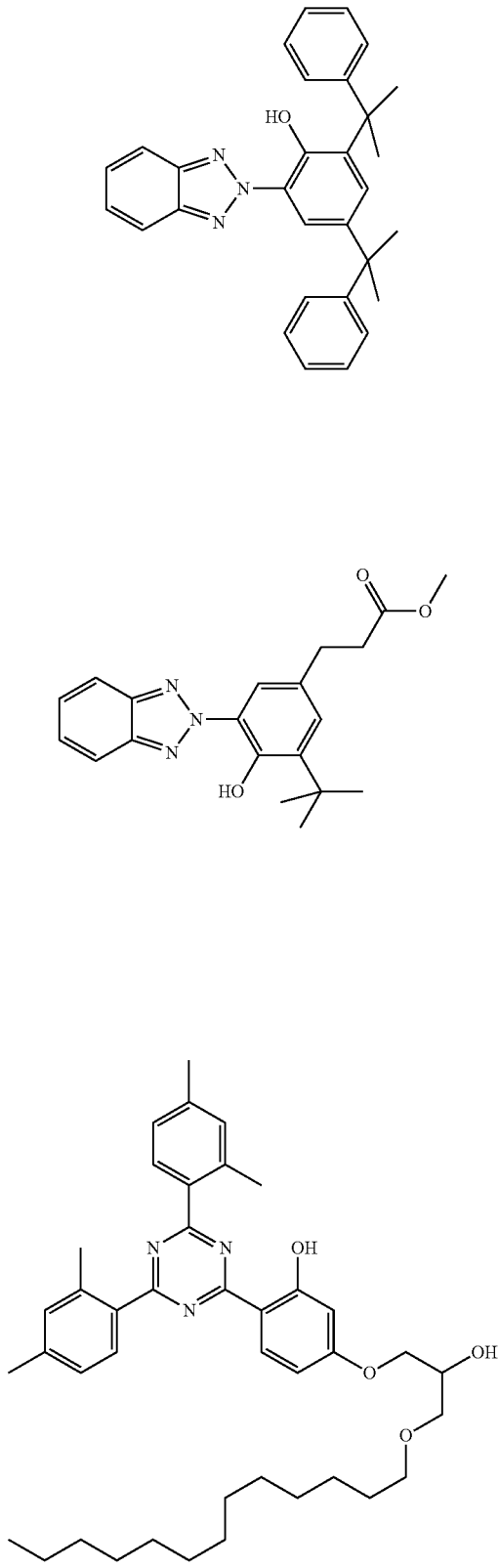
TABLE E-continued
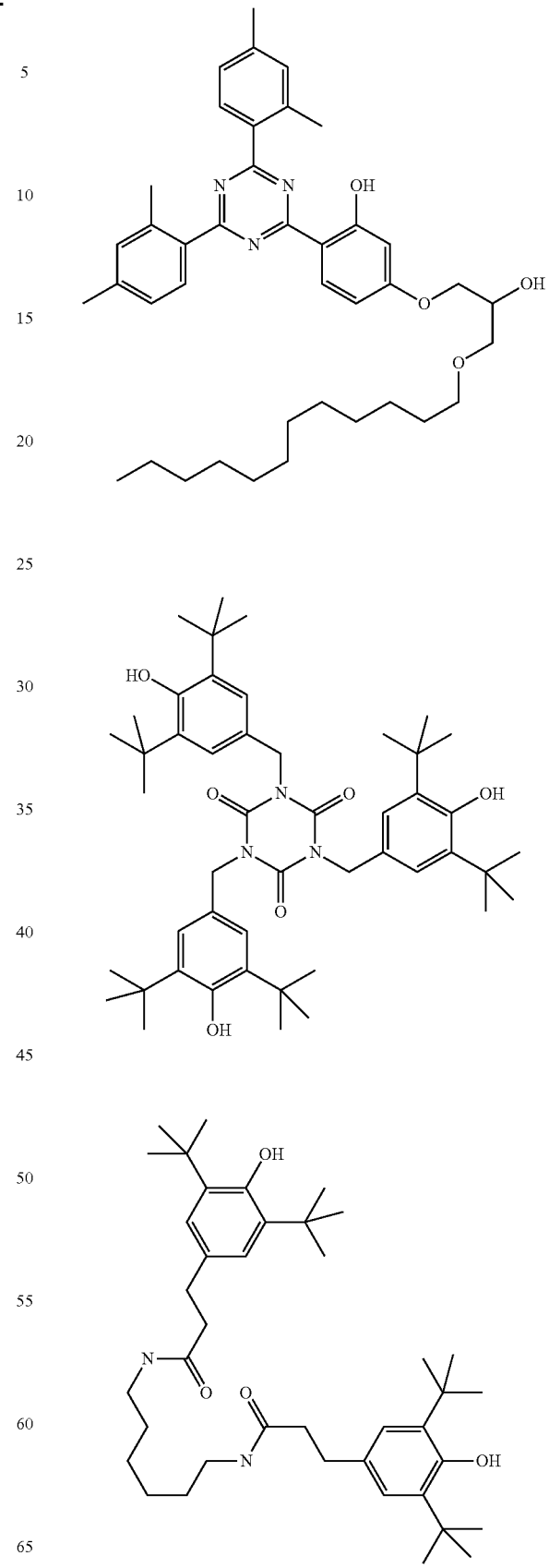

TABLE E-continued

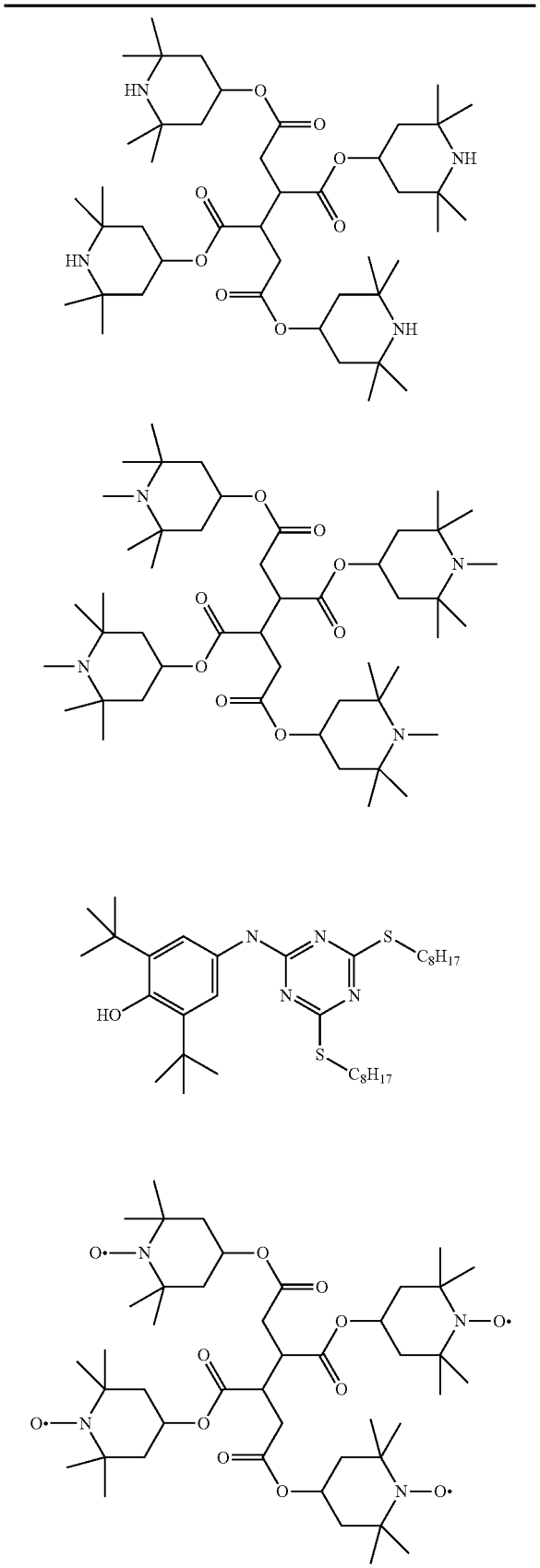

TABLE E-continued

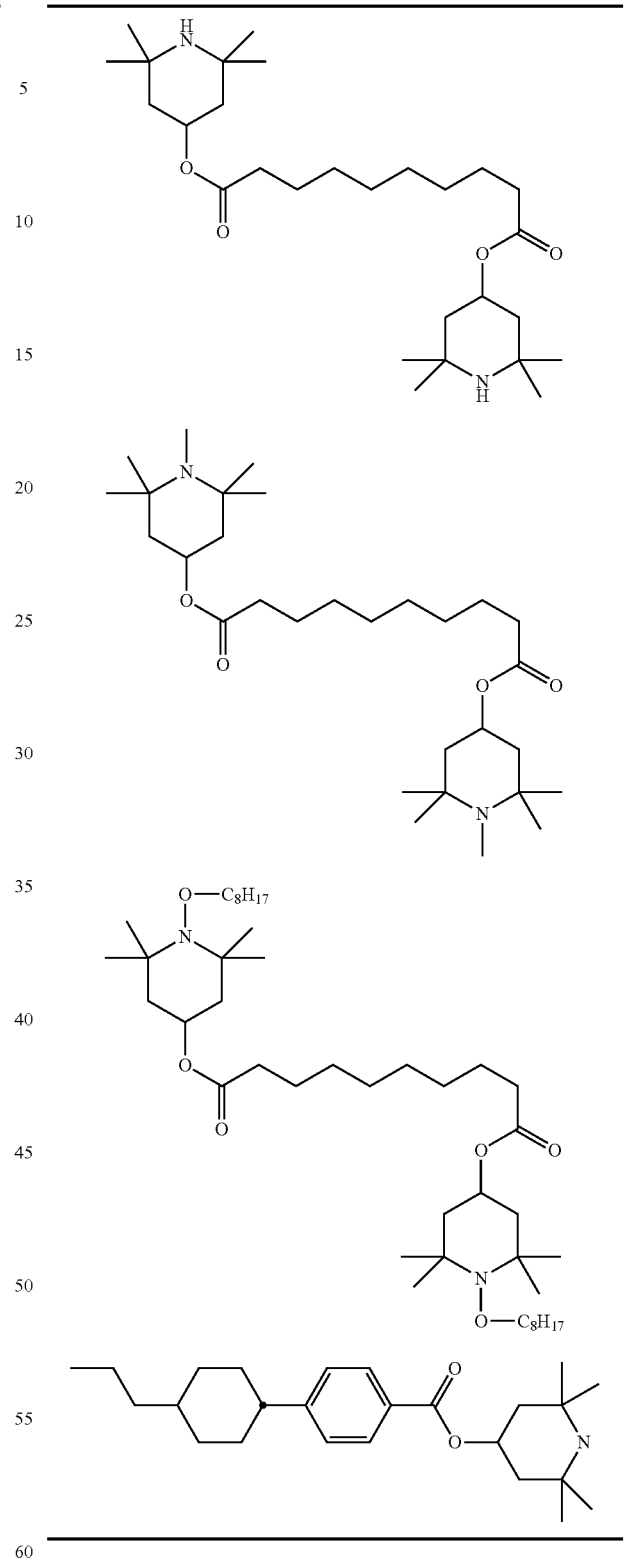

In a preferred embodiment of the present invention, the mesogenic media comprise one or more compounds selected from the group of the compounds from Table E.

The following table, Table F, shows illustrative compounds which can preferably be used as chiral dopants in the mesogenic media in accordance with the present invention.

TABLE F
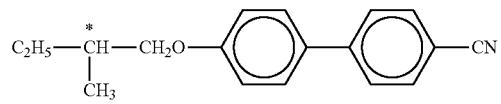
C 15
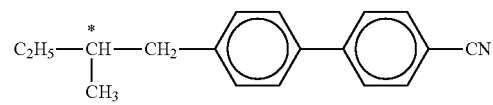
CB 15
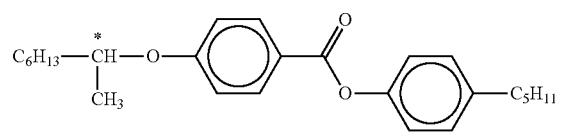
CM 21
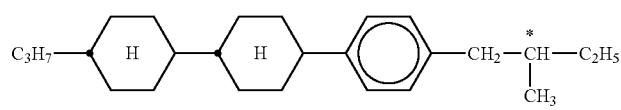
CM 44
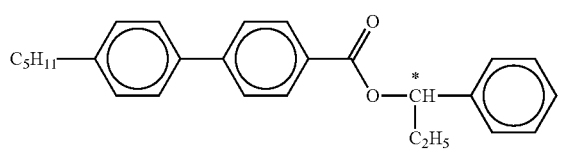
CM 45
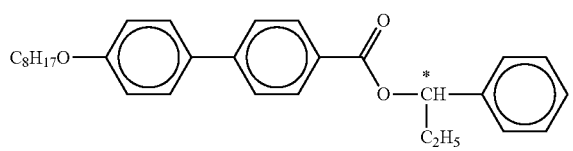
CM 47
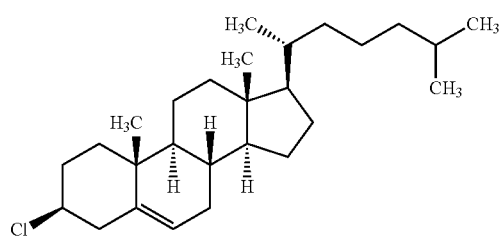
CC
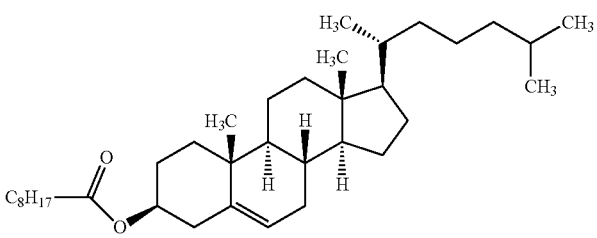
CN TABLE F-continued
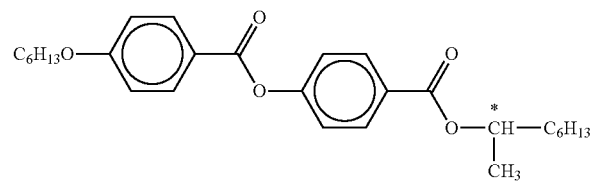
R/S-811
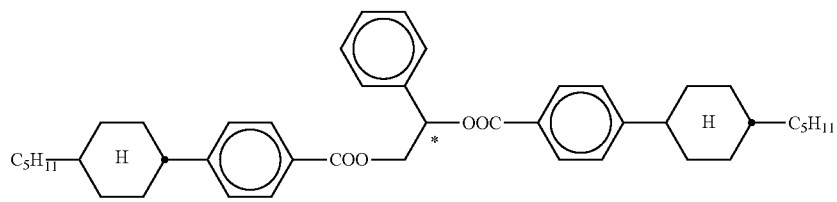
R/S-1011
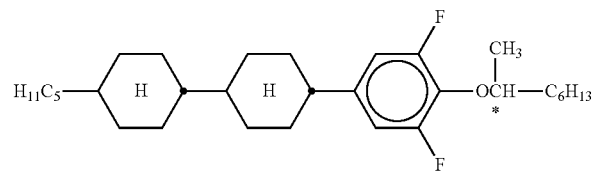
R/S-2011
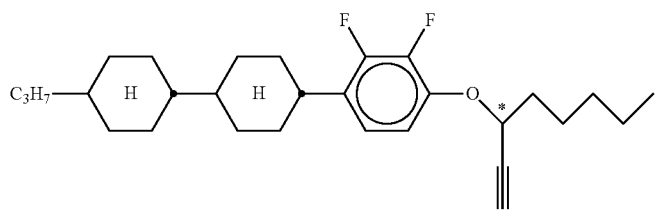
R/S-3011
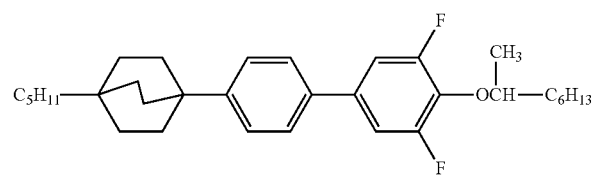
R/S-4011
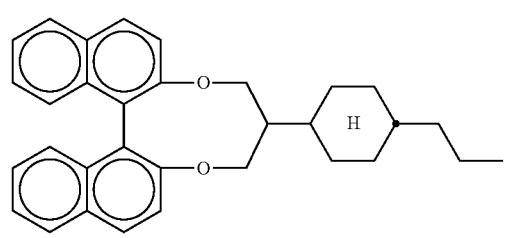
R/S-5011

In a preferred embodiment of the present invention, the mesogenic media comprise one or more compounds selected from the group of the compounds from Table F.

The mesogenic media in accordance with the present application preferably comprise two or more, preferably four or more, compounds selected from the group consisting of the compounds from the above tables.

The liquid-crystal media in accordance with the present invention preferably comprise
seven or more, preferably eight or more, compounds, preferably compounds having three or more, preferably four or more, different formulae, selected from the group of the compounds from Table D.

Unless indicated otherwise, all saturated carbocycles preferably have trans-configuration where it is possible.

The compounds from table D are known to the expert and can be synthesised according to procedures described elsewhere.

All percentages given above and below are percent by mass based on the total mixture.

EXAMPLES

The examples below illustrate the present invention without limiting it in any way.
Synthesis
4-Alkylphenylacetylenes and 4-fluorophenylacetylene are known to the literature and were synthesised as described therein.

1. 1-(4-Butyl-phenylethynyl)-2,5-difluoro-4-(4-hexyl-phenylethynyl)benzene 1.1 1-Bromo-4-(4-ethyl-phenylethynyl)-2,5-difluoro-benzene and 1,4-Bis-(4-hexyl-phenylethynyl)-2,5-difluoro-benzene

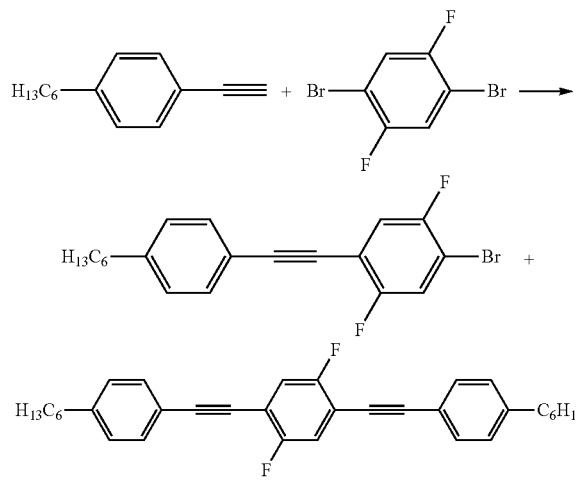

To a mixture of 1,4-dibromo-2,5-difluorobenzene (101 g, 0.37 mol), bis(triphenylphosphine)palladium(II)chloride (15.0 g, 0.02 mol) and copper(I)iodid (2.0 g, 0.01 mol) in diisopropylamine (500 ml) a solution of 4-hexylphenylacetylene (CAS 79887-11-9, 93.2 g, 0.50 mol) in diisopropylamine (1.00 l) is added dropwise at 70° C. The reaction is stirred at room temp. overnight, filtered and the solvent is evaporated i. vac. The product mixture is separated by column chromatography with petrol ether on silica to give 1-bromo-4-(4-ethyl-phenylethynyl)-2,5-difluoro-benzene and 1,4-bis-(4-hexyl-phenylethynyl)-2,5-difluoro-benzene. The latter is recrystallised from petrol ether to give colourless crystals, m.p. 94° C.

1.2 1-(4-Butyl-phenylethynyl)-2,5-difluoro-4-(4-hexyl-phenylethynyl)benzene

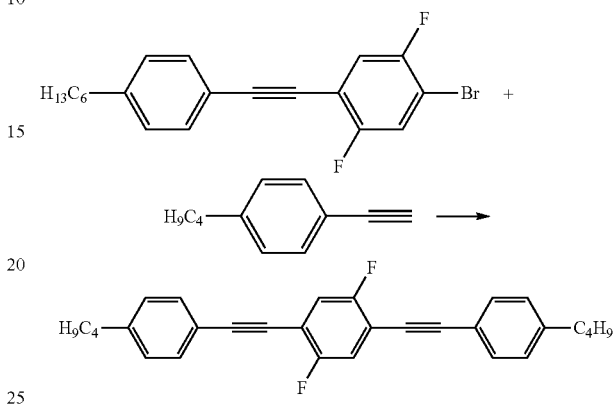

To a mixture of 1-bromo-4-(4-ethyl-phenylethynyl)-2,5-difluoro-benzene (19.5 g, 45.5 mmol), bis(triphenylphosphin)palladium(II)chlorid (1.5 g, 2.0 mmol) and copper(I) iodid (0.2 g, 1.0 mmol) in diisopropylamine (50 ml) a solution of 4-butylphenylacetylene (9.0 g, 56.9 mmol) in diisopropylamine (100 ml) is added dropwise at 70° C. The reaction is stirred at room temp. overnight, filtered and the solvent is evaporated i. vac. The product is purified by column chromatography with petrol ether on silica and recrystallised from petrol ether to give 1-(4-butyl-phenylethynyl)-2,5-difluoro-4-(4-hexyl-phenylethynyl)-benzene as colourless crystals, m.p. 73° C.

2. 1-(4-Butyl-phenylethynyl)-2,5-difluoro-4-(4-fluoro-phenylethynyl)benzene 2.1 1-Bromo-2,5-difluoro-4-(4-fluoro-phenylethynyl)-benzene

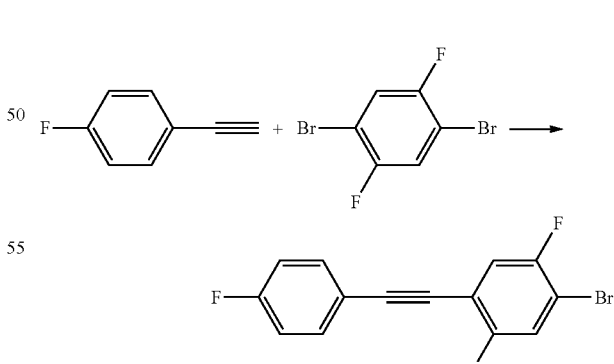

To a mixture of 1,4-dibromo-2,5-difluorobenzene (171.3 g, 0.63 mol), bis(triphenylphosphin)palladium(II)chloride (11.7 g, 16.6 mmol) and copper(I)iodide (1.6 g, 8.3 mmol) in diisopropylamine (500 ml) a solution of 4-fluorophenylacetylene (50.0 g, 0.42 mol) in diisopropylamine (1000 ml) is added dropwise at 70° C. The reaction is stirred at room temp. overnight, filtered and the solvent is evaporated i. vac. The product is purified by column chromatography with petrol ether on silica and recrystallised from petrol ether to give 1-bromo-2,5-difluoro-4-(4-fluoro-phenylethynyl)benzene as colourless crystals.

2.2 1-(4-Butyl-phenylethynyl)-2,5-difluoro-4-(4-fluoro-phenylethynyl)benzene

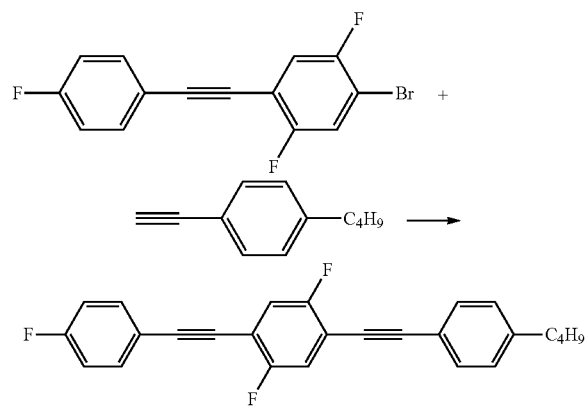

To a mixture of 1-bromo-2,5-difluoro-4-(4-fluoro-phenylethynyl)-benzene (16.0 g, 45.0 mmol), bis(triphenylphosphin)palladium(II)chloride (1.5 g, 2.0 mmol) and copper(I) iodide (0.2 g, 1.0 mmol) in diisopropylamine (80 ml) a solution of 4-butylphenylacetylen (8.5 g, 54.0 mmol) in diisopropylamine (100 ml) is added dropwise at 70° C. The reaction is stirred at room temp. overnight, filtered and the solvent is evaporated i. vac. The product is purified by column chromatography with petrol ether on silica and recrystallised from petrol ether to give 1-(4-Ethyl-phenylethynyl)-2,5-difluoro-4-(4-fluoro-phenylethynyl)-benzene as colourless crystals, m.p. 99° C.

The following table 1 shows the phase sequences of the examples 1 and 2 and of further compounds obtained in analogy to the above described syntheses.

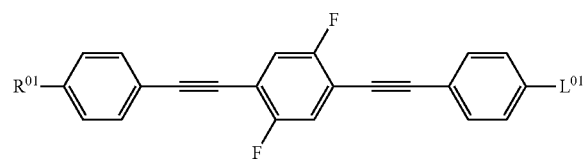

TABLE 1

| Example | $R^{01}$ | $L^{01}$ | Phase (T/° C.) |
|---|---|---|---|
| 1 | $C_4H_9$ | $C_6H_{13}$ | K 73 N 157 I |
| 2 | $C_4H_9$ | F | K 99 N 162 I |
| 3 | $C_3H_7$ | $C_6H_{13}$ | K 67 N 169 I |
| 4 | $C_3H_7$ | F | K 105 N 179 I |
| 5 | $C_5H_{11}$ | F | K 109 N 163 I |
| 6 | $C_6H_{13}$ | F | K 108 N 150 I |
| 7 | $C_6H_{13}$ | $C_6H_{13}$ | K 94 N 149 I |
| 8 | $C_3H_7$ | $C_3H_7$ | K 153 N 199 I |
| 9 | $C_4H_9$ | $C_4H_9$ | K 100 N 167 I |
| 10 | $C_5H_{11}$ | $C_5H_{11}$ | K 87 N 172 I |

MIXTURE EXAMPLES

The examples are compared to reference mixtures from the state of the art that do not contain compounds of formula A of the present invention.

Examples 1.1 to 1.4

The following reference mixture (RM-1) and Mixture examples M-1 to M-4 are prepared and investigated.

| Mixture RM-1 | |
|---|---|
| Composition | |
| Compound | Concentration/ |
| No.   Abbreviation | % by weight |
| 1   CC-3-V | 16.0 |
| 2   PP-1-2V1 | 6.0 |
| 3   PPTUI-3-2 | 20.0 |
| 4   PPTUI-3-4 | 38.0 |
| 5   GGP-5-CL | 18.0 |
| 6   PGUQU-5-F | 2.0 |
| Σ | 100.0 |

Physical properties

T (N, I) = 123.0° C.
Δn (20° C., 589 nm) = 0.2838
Δε (20°, 1 kHz) = 3.2
$\gamma_1$ (20° C.) = 253 mPa · s
$k_{11}$ (20° C.) = 17.5 pN
$k_{33}$ (20° C.) = 23.3 pN

| Mixture M-1 | |
|---|---|
| Composition | |
| Compound | Concentration/ |
| No.   Abbreviation | % by weight |
| 1   CC-3-V | 16.0 |
| 2   PP-1-2V1 | 6.0 |
| 3   PPTUI-3-2 | 15.0 |
| 4   PPTUI-3-4 | 28.0 |
| 5   GGP-5-CL | 18.0 |
| 6   PGUQU-5-F | 2.0 |
| 7   PTXTP-4-6 | 5.0 |
| 8   PTXTP-3-F | 5.0 |
| 9   PTXTP-4-F | 5.0 |
| Σ | 100.0 |

Physical properties

T (N, I) = 122.0° C.
Δn (20° C., 589 nm) = N/A
Δε (20°, 1 kHz) = 3.6
$\gamma_1$ (20° C.) = 269 mPa · s
$k_{11}$ (20° C.) = 16.8 pN
$k_{33}$ (20° C.) = 25.4 pN

Mixture M-2

Composition

| No. | Compound Abbreviation | Concentration/% by weight |
|---|---|---|
| 1 | CC-3-V | 16.0 |
| 2 | PP-1-2V1 | 6.0 |
| 3 | PPTUI-3-2 | 20.0 |
| 4 | PPTUI-3-4 | 30.0 |
| 5 | GGP-3-CL | 10.0 |
| 6 | GGP-5-CL | 8.0 |
| 7 | PTXTP-4-6 | 10.0 |
| Σ | | 100.0 |

Physical properties

T (N, I) = 124.0° C.
Δn (20° C., 589 nm) = N/A
Δε (20°, 1 kHz) = 2.7
$\gamma_1$ (20° C.) = 297 mPa · s
$k_{11}$ (20° C.) = 17.4 pN
$k_{33}$ (20° C.) = 26.4 pN

Mixture M-3

Composition

| No. | Compound Abbreviation | Concentration/% by weight |
|---|---|---|
| 1 | CC-3-V | 10.0 |
| 2 | PP-1-2V1 | 7.0 |
| 3 | PPTUI-3-2 | 20.0 |
| 4 | PPTUI-3-4 | 30.0 |
| 5 | GGP-5-CL | 20.0 |
| 6 | PGUQU-5-F | 3.0 |
| 7 | PTXTP-4-6 | 10.0 |
| Σ | | 100.0 |

Physical properties

T (N, I) = 129.0° C.
Δn (20° C., 589 nm) = N/A
Δε (20°, 1 kHz) = 4.0
$\gamma_1$ (20° C.) = 331 mPa · s
$k_{11}$ (20° C.) = 17.8 pN
$k_{33}$ (20° C.) = 24.7 pN

Mixture M-4

Composition

| No. | Compound Abbreviation | Concentration/% by weight |
|---|---|---|
| 1 | PPTUI-3-2 | 20.0 |
| 2 | PPTUI-3-4 | 30.0 |
| 3 | GGP-3-CL | 20.0 |
| 4 | PGUQU-5-F | 3.0 |
| 5 | PTXTP-4-6 | 10.0 |
| 6 | PTP(1)I-4-A1 | 17.0 |
| Σ | | 100.0 |

Physical properties

T (N, I) = 129.5° C.
Δn (20° C., 589 nm) = N/A
Δε (20°, 1 kHz) = 4.1
$\gamma_1$ (20° C.) = 632 mPa · s
$k_{11}$ (20° C.) = 14.7 pN
$k_{33}$ (20° C.) = 28.7 pN All mixtures M1 to M4 are very well suitable for applications in the microwave range, especially for phase shifters.

In the following table 2, examples 1.4 to 1.4 are shown in comparison concerning tuneability (τ), dielectric loss (tan $\delta_{\varepsilon_{r,\perp}}$) and material quality (η).

TABLE 2

| Example | Mixture | tan $\delta_{\varepsilon\,r,\perp}$ | τ | η |
|---|---|---|---|---|
| (Ref.) | RM-1 | 0.0125 | 0.2132 | 17.1 |
| 1.1 | M-1 | 0.0126 | 0.2247 | 17.9 |
| 1.2 | M-2 | 0.0125 | 0.2189 | 17.5 |
| 1.3 | M-3 | 0.0129 | 0.2279 | 17.7 |
| 1.4 | M-4 | 0.0127 | 0.2502 | 19.7 |

The comparison shows improved material quality η for all examples 1.1 to 1.4 due to improved tuneabilities with the same or only slightly larger dielectric losses.

Examples 2.1-2.2

The following reference mixture (RM-2) and mixture examples M-5 and M-6 are prepared and investigated.

Mixture RM-2

Composition

| No. | Compound Abbreviation | Concentration/% by weight |
|---|---|---|
| 1 | PPTUI-3-2 | 10.0 |
| 2 | PPTUI-3-4 | 15.0 |
| 2 | PPTUI-4-4 | 30.0 |
| 3 | PTP-3-5 | 14.0 |
| 4 | PTP-4-5 | 14.0 |
| 5 | PGUQU-3-F | 2.0 |
| 6 | PGUQU-5-F | 3.0 |
| 7 | CC-3-V | 12.0 |
| Σ | | 100.0 |

Physical properties

T (N, I) = 97.5° C.
Δn (20° C., 589 nm) = 0.2652
Δε (20°, 1 kHz) = 2.1
$\gamma_1$ (20° C.) = 220 mPa · s
$k_{11}$ (20° C.) = 13.5 pN
$k_{33}$ (20° C.) = 19.6 pN

Mixture M-5

Composition

| No. | Compound Abbreviation | Concentration/% by weight |
|---|---|---|
| 1 | PPTUI-3-2 | 10.0 |
| 2 | PPTUI-3-4 | 10.0 |

Mixture M-5

Composition

| | | |
|---|---|---|
| 2 | PPTUI-4-4 | 30.0 |
| 3 | PTP-3-5 | 11.0 |
| 4 | PTP-4-5 | 11.0 |
| 5 | PGUQU-3-F | 3.0 |
| 6 | PGUQU-5-F | 3.0 |
| 7 | CC-3-V | 12.0 |
| 8 | PTXTP-4-6 | 10.0 |
| Σ | | 100.0 |

Physical properties

T (N, I) = N/A ° C.
Δn (20° C., 589 nm) = N/A
Δε (20°, 1 kHz) = 2.4
$\gamma_1$ (20° C.) = 382 mPa · s
$k_{11}$ (20° C.) = 14.4 pN
$k_{33}$ (20° C.) = 21.1 pN

Mixture M-6

Composition

| No. | Abbreviation | % by weight |
|---|---|---|
| 1 | PPTUI-3-2 | 10.0 |
| 2 | PPTUI-3-4 | 10.0 |
| 2 | PPTUI-4-4 | 30.0 |
| 3 | PTP-3-5 | 11.0 |
| 4 | PTP-4-5 | 11.0 |
| 5 | PGUQU-3-F | 2.0 |
| 6 | PGUQU-5-F | 2.0 |
| 7 | PTXTP-4-6 | 10.0 |
| 8 | PTP(1)I-4-A1 | 14.0 |
| Σ | | 100.0 |

Physical properties

T (N, I) = N/A ° C.
Δn (20° C., 589 nm) = N/A
Δε (20°, 1 kHz) = 2.2
$\gamma_1$ (20° C.) = 393 mPa · s
$k_{11}$ (20° C.) = 11.5 pN
$k_{33}$ (20° C.) = 21.1 pN Both mixtures M5 and M6 are very well suitable for applications in the microwave range, especially for phase shifters.

In the following table 2, examples 2.1. and 2.2 are shown in comparison with the reference RM-2 concerning tunability (t), dielectric loss (tan $\delta_{\epsilon^r,\perp}$) and material quality (η).

TABLE 2

| Example | Mixture | tan $\delta_{\epsilon\, r,\perp}$ | τ | η |
|---|---|---|---|---|
| (Ref.) | RM-2 | 0.0103 | 0.2060 | 20.0 |
| 1.1 | M-5 | 0.0102 | 0.2122 | 20.7 |
| 1.2 | M-6 | 0.0088 | 0.2317 | 26.3 |

The comparison shows improved material quality η for both examples 2.1 and 2.2 due to improved tunabilities with lower dielectric losses.

Example 3.1

The following reference mixture (RM-3) and Mixture examples M-7 are prepared and investigated.

Mixture RM-3

Composition

| No. | Abbreviation | % by weight |
|---|---|---|
| 1 | PTiNpTP-4-4 | 21.0 |
| 2 | PTP(c3)TP-4-4 | 20.0 |
| 3 | PTiNpTP-4-6 | 22.0 |
| 4 | PTP(1)I-4-A1 | 30.0 |
| 5 | PTiNpTP-6-6 | 7.0 |
| Σ | | 100.0 |

Physical properties

T (N, I) = N/A
Δn (20° C., 589 nm) = N/A
Δε (20°, 1 kHz) = 2.2
$\gamma_1$ (20° C.) = 2136 mPa · s
$k_{11}$ (20° C.) = 11.5 pN
$k_{33}$ (20° C.) = 21.1 pN
tan $\delta_{\epsilon\, r,\perp}$ = 0.0054
τ = 0.2654
η = 48.9

Mixture M-7

Composition

| No. | Abbreviation | % by weight |
|---|---|---|
| 1 | PTiNpTP-4-4 | 21.0 |
| 2 | PTiNpTP-4-6 | 22.0 |
| 3 | PTP(1)I-4-A1 | 35.0 |
| 4 | PTiNpTP-6-6 | 7.0 |
| 5 | PTXTP-4-4 | 5.0 |
| 6 | PTXTP-3-F | 5.0 |
| 7 | PTXTP-4-F | 5.0 |
| Σ | | 100.0 |

Physical properties

T (N, I) = N/A ° C.
Δn (20° C., 589 nm) = N/A
Δε (20°, 1 kHz) = 1.3
$\gamma_1$ (20° C.) = 1418 mPa · s
$k_{11}$ (20° C.) = 11.4 pN
$k_{33}$ (20° C.) = 30.9 pN
tan $\delta_{\epsilon\, r,\perp}$ = 0.0058
τ = 0.278
η = 48.1

Mixtures M7 is very well suitable for applications in the microwave range, especially for phase shifters.

The comparison of Mixture M-7 with Reference RM-3 shows similar properties in terms of material quality but at the same time a significantly reduced rotational viscosity.

The invention claimed is:

1. A liquid-crystal medium, comprising one or more compounds of formula A-2

A-2

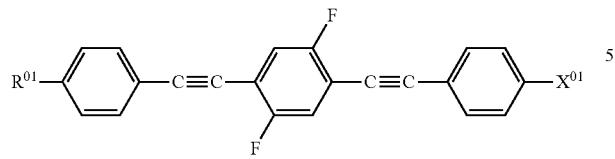

wherein
R$^{01}$ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms, and X$^{01}$ denotes F, Cl, —NCS, —SF$_5$, fluorinated alkyl, fluorinated alkenyl or fluorinated alkoxy having 1 to 7 C atoms;

and one or more compounds of formula II

II wherein
L$^{21}$ denotes R$^{21}$ and, in the case where Z$^{21}$ and/or Z$^{22}$ denote trans-CH=CH— or trans-CF=CF—, alternatively denotes X$^{21}$, L$^{22}$ denotes R$^{22}$ and, in the case where Z$^{21}$ and/or Z$^{22}$ denote trans-CH=CH— or trans-CF=CF—, alternatively denotes X$^{22}$, R$^{21}$ and R$^{22}$ independently of one another, denote H, unfluorinated alkyl or unfluorinated alkoxy having 1 to 17 C atoms or unfluorinated alkenyl, unfluorinated alkynyl, unfluorinated alkenyloxy or unfluorinated alkoxyalkyl having 2 to 15 C atoms, X$^{21}$ and X$^{22}$ independently of one another, denote F, Cl, —CN, —NCS, —SF$_5$, fluorinated alkyl or alkoxy having 1 to 7 C atoms or fluorinated alkenyl, alkenyloxy or alkoxyalkyl having 2 to 7 C atoms, or —NCS, Z$^{21}$ and Z$^{22}$ denotes trans-CH=CH—, trans-CF=CF—, —C≡C— or a single bond, with the proviso that at least one of Z$^{21}$ and Z$^{22}$ denotes —C≡C—,

to

independently of one another, denote

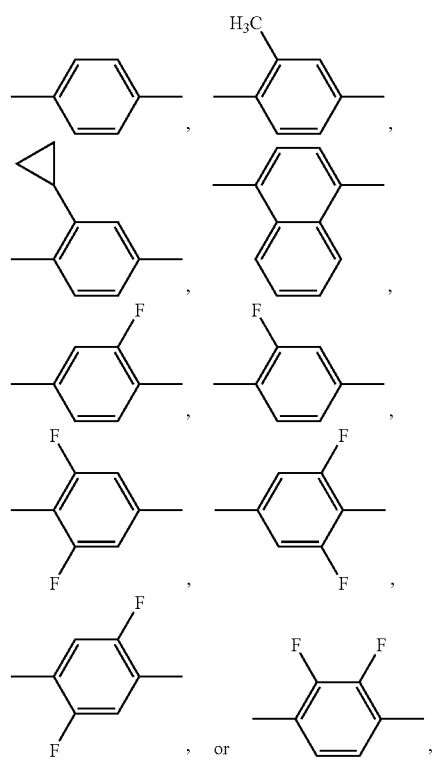

and n denotes 0 or 1.

2. The liquid-crystal medium according to claim 1, additionally comprising one or more compounds of the formula I

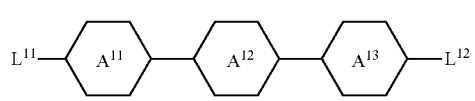
I wherein
L$^{11}$ denotes R$^{11}$ or X$^{11}$,
L$^{12}$ denotes R$^{12}$ or X$^{12}$,
R$^{11}$ and R$^{12}$ independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms, X$^{11}$ and X$^{12}$ independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, and

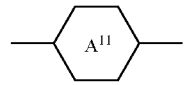

to

independently of one another, denote

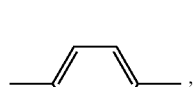
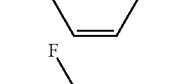
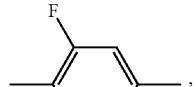
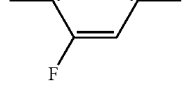, or
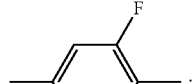
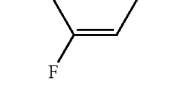.

3. The liquid-crystal medium according to claim 2, wherein one or more compounds of formula I are of formula I-1c

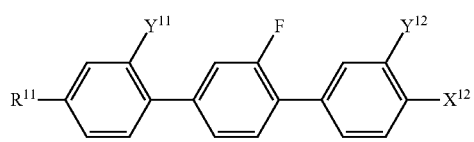

I-1c wherein
$Y^{11}$ and $Y^{12}$ independently of one another, denote H or F,
$R^{11}$ denotes unfluorinated alkyl having 1 to 7 C atoms or unfluorinated alkenyl having 2 to 7 C atoms, and
$X^{12}$ denotes F, Cl or $OCF_3$.

4. The liquid-crystal medium according to claim 1, wherein one or more compounds of formula II are of one or more compounds of formulae II-1 to II-6:

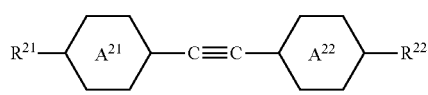

II-1

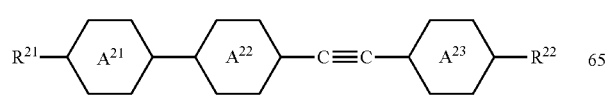

II-2

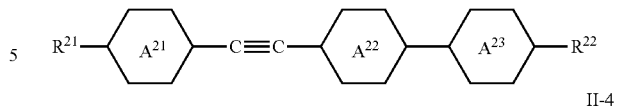

II-3

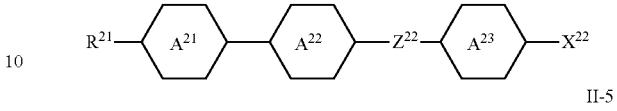

II-4

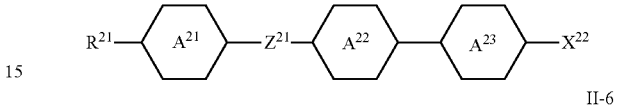

II-5

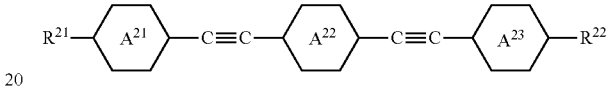

II-6 in which
$Z^{21}$ and $Z^{22}$ denote trans-CH=CH— or trans-CF=CF—,
$R^{21}$ and $R^{22}$ independently of one another, denote H, unfluorinated alkyl or unfluorinated alkoxy having 1 to 17 C atoms or unfluorinated alkenyl, unfluorinated alkynyl, unfluorinated alkenyloxy or unfluorinated alkoxyalkyl having 2 to 15 C atoms,
$X^{22}$ denotes F, Cl, —CN or —NCS, and
and one of

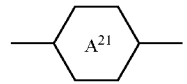

to

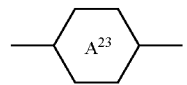

denotes

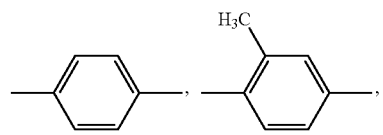
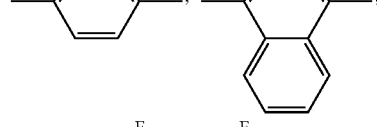
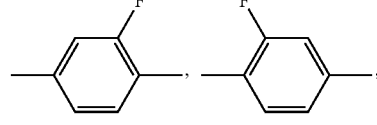

-continued

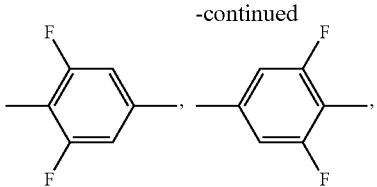

and the others independently of each other denote

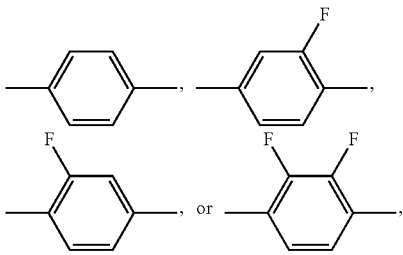

and where the compounds of formula II-3 are excluded from the compounds of formula II-2.

5. The liquid-crystal medium according to claim 1, wherein the total concentration of the one or more compounds of formula A-2 in the medium is 1% to 30%.

6. The liquid-crystal medium according to claim 1, wherein, in formula A-2,
$R^{01}$ denotes unfluorinated alkyl with 1 to 6 C atoms and $X^{01}$ denotes F.

7. The liquid-crystal medium according to claim 1, wherein the total concentration of the one or more compounds of the formula II in the medium is 30% to 99%.

8. A component for high-frequency technology, comprising the liquid crystal medium according to claim 1.

9. The component according to claim 8, which is suitable for operation in the microwave range.

10. The component according to claim 8, which is a phase shifter.

11. A process for preparing the liquid-crystal medium according to claim 1, comprising mixing one or more compounds of formula A-2 with one or more compounds of formula II, and optionally with one or more further compounds and/or with one or more additives.

12. A microwave antenna array, comprising one or more components according to claim 8.

13. A compound of formula A-2

A-2
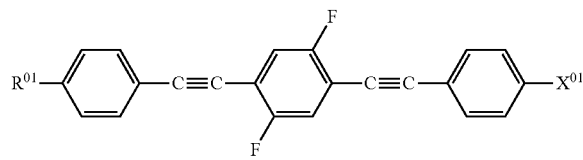

wherein
$R^{01}$ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms, and
$X^{01}$ denotes F, Cl, —NCS, —$SF_5$, fluorinated alkyl, fluorinated alkenyl or fluorinated alkoxy having 1 to 7 C atoms.

14. The compound according to claim 13, wherein $X^{01}$ denotes F.

15. The compound according to claim 13, wherein one or more compounds of formula A-2 are of one or more compounds of formulae A-2a to A-2f A-2a
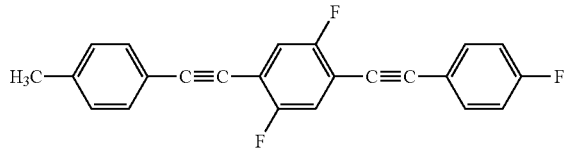

A-2b
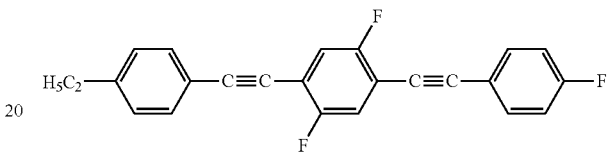

A-2c
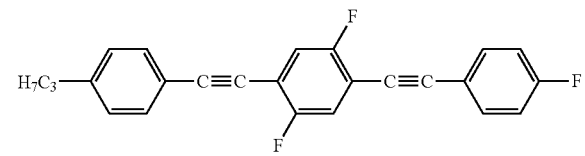

A-2d
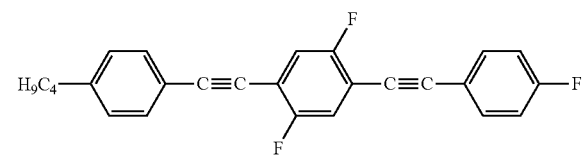

A-2e
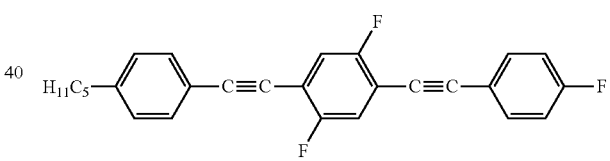

A-2f
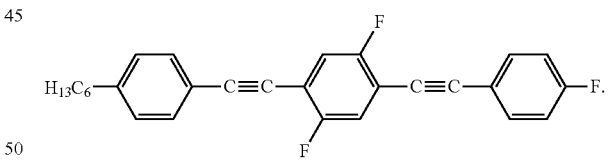

16. The compound according to claim 15, wherein one or more compounds of formula A-2 are of one or more compounds of formulae A-2c to A-2f.

17. The liquid-crystal medium according to claim 1, wherein, in formula A-2, $X^{01}$ denotes F.

18. The liquid-crystal medium according to claim 1, wherein, in formula A-2, $X^{01}$ denotes unfluorinated alkyl with 3 to 6 C atoms and $X^{01}$ denotes F.

19. The liquid-crystal medium according to claim 1, wherein the total concentration of the one or more compounds of formula A-2 in the medium is 5% to 20%.

20. The liquid-crystal medium according to claim 1, wherein the total concentration of the one or more compounds of formula A-2 in the medium is 10 to 15%.

* * * * *